(12) United States Patent
Hwang et al.

(10) Patent No.: US 12,035,308 B2
(45) Date of Patent: Jul. 9, 2024

(54) DOWNLINK SIGNAL TRANSMISSION/RECEPTION METHOD FOR MULTIPLE TRANSPORT BLOCK SCHEDULING, AND DEVICE THEREFOR

(71) Applicant: LG Electronics Inc., Seoul (KR)

(72) Inventors: Seunggye Hwang, Seoul (KR); Joonkui Ahn, Seoul (KR); Changhwan Park, Seoul (KR)

(73) Assignee: LG Electronics Inc., Seoul (KR)

( * ) Notice: Subject to any disclaimer, the term of this patent is extended or adjusted under 35 U.S.C. 154(b) by 362 days.

(21) Appl. No.: 17/421,224

(22) PCT Filed: Feb. 14, 2020

(86) PCT No.: PCT/KR2020/002151
§ 371 (c)(1),
(2) Date: Jul. 7, 2021

(87) PCT Pub. No.: WO2020/167056
PCT Pub. Date: Aug. 20, 2020

(65) Prior Publication Data
US 2022/0070897 A1 Mar. 3, 2022

(30) Foreign Application Priority Data
Feb. 15, 2019 (KR) .......................... 10-2019-0018080

(51) Int. Cl.
*H04W 72/1268* (2023.01)
*H04L 5/00* (2006.01)
(Continued)

(52) U.S. Cl.
CPC ....... *H04W 72/1268* (2013.01); *H04L 5/0044* (2013.01); *H04L 5/0091* (2013.01); *H04W 4/70* (2018.02); *H04W 72/23* (2023.01)

(58) Field of Classification Search
CPC ................. H04L 1/1835; H04L 1/1812; H04L 1/1864; H04L 1/1858; H04L 5/0044;
(Continued)

(56) References Cited

U.S. PATENT DOCUMENTS

2018/0199314 A1* 7/2018 Takeda ................... H04L 1/1822
2018/0338301 A1* 11/2018 Gao ........................ H04W 72/23
(Continued)

OTHER PUBLICATIONS

Ericsson, "Updated Feature lead summary Scheduling of multiple DL UL transport blocks in LTE MTC," Tdoc R1-1813759, Presented at 3GPP TSG-RAN WG1 Meeting #95, Spokane, USA, Nov. 12-16, 2018, 13 pages.
(Continued)

*Primary Examiner* — Rushil P. Sampat
(74) *Attorney, Agent, or Firm* — Fish & Richardson P.C.

(57) ABSTRACT

A method for scheduling multiple transport blocks includes: receiving first downlink control information (DCI); performing monitoring for the detection of second DCI in a time interval between the reception termination of the first DCI and the transmission or reception start of transport blocks (TBs) scheduled by the first DCI, on the basis of the number of TBs scheduled by the first DCI being less than a specific number; and omitting the monitoring for the detection of the second DCI in the time interval between the reception termination of the first DCI and the transmission or reception start of the TBs scheduled by the first DCI, on the basis of the number of TBs scheduled by the first DCI being greater than or equal to the specific number.

19 Claims, 23 Drawing Sheets

(51) Int. Cl.
*H04W 4/70* (2018.01)
*H04W 72/23* (2023.01)

(58) Field of Classification Search
CPC .............. H04L 5/0091; H04W 28/06; H04W 72/0406; H04W 72/20; H04W 88/02; H04W 88/08; H04W 72/1268; H04W 4/70; H04W 72/23
See application file for complete search history.

(56) References Cited

U.S. PATENT DOCUMENTS

| | | | |
|---|---|---|---|
| 2019/0222360 A1* | 7/2019 | Nam | H04W 28/06 |
| 2022/0070902 A1* | 3/2022 | Li | H04W 72/1273 |
| 2022/0095351 A1* | 3/2022 | Baldemair | H04W 72/23 |

OTHER PUBLICATIONS

International Search Report and Written Opinion in International Appln. No. PCT/KR2020/002151, dated Jun. 3, 2020, 13 pages.
Lenovo & Motorola Mobility, Design of scheduling of multiple DL/UL TB for Rel. 16 MTC, R1-1812788, Presented at 3GPP TSG RAN WG1 Meeting #95, Spokane, USA, Nov. 12-16, 2018, 5 pages.
LG Electronics, "Discussion on multiple transport blocks scheduling in MTC," R1-1810233, Presented at 3GPP TSG RAN WG1 Meeting #94bis, Chengdu, China, Oct. 8-12, 2018, 5 pages.
Samsung, "Scheduling of multiple transport blocks for NB-IoT," R1-1812948, 3GPP TSG RAN WG1 Meeting #95, Spokane, US, Nov. 12-16, 2018, 7 pages.
ZTE, "Consideration on scheduling enhancement for NB-IoT," R1-1810510, Presented at 3GPP TSG RAN WG1 Meeting #94bis, Chengdu, China, Oct. 8-12, 2018, 8 pages.

* cited by examiner

DOWNLINK SIGNAL TRANSMISSION/RECEPTION METHOD FOR MULTIPLE TRANSPORT BLOCK SCHEDULING, AND DEVICE THEREFOR

CROSS-REFERENCE TO RELATED APPLICATIONS

This application is a National Stage application under 35 U.S.C. § 371 of International Application No. PCT/KR2020/002151, filed on Feb. 14, 2020, which claims the benefit of Korean Application No. 10-2019-0018080, filed on Feb. 15, 2019. The disclosures of the prior applications are incorporated by reference in their entirety.

TECHNICAL FIELD

The present disclosure relates to a wireless communication system, and more particularly, to a method and apparatus for transmitting and receiving a signal in a wireless communication system supporting multi-transport block (multi-TB) scheduling.

BACKGROUND

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of code division multiple access (CDMA) system, frequency division multiple access (FDMA) system, time division multiple access (TDMA) system, orthogonal frequency division multiple access (OFDMA) system, single carrier frequency division multiple access (SC-FDMA) system, and the like.

SUMMARY

An aspect of the present disclosure is to provide a method and apparatus for efficiently transmitting and receiving a signal in a wireless communication system supporting multi-transport block (multi-TB) scheduling.

More particularly, an aspect of the present disclosure is to provide a method and apparatus for efficiently transmitting and receiving a downlink control channel or downlink control information (DCI) in a wireless communication system supporting multi-TB scheduling.

It will be appreciated by persons skilled in the art that the objects that could be achieved with the present disclosure are not limited to what has been particularly described hereinabove and the above and other objects that the present disclosure could achieve will be more clearly understood from the following detailed description.

According to an aspect of the present disclosure, a method performed by a user equipment (UE) in a wireless communication system supporting multi-transport block (multi-TB) scheduling may include receiving first downlink control information (DCI), monitoring second DCI during a time period between the end of the reception of the first DCI and the start of transmission or reception of a TB scheduled by the first DCI based on the number of TBs scheduled by the first DCI being less than a specific number, and skipping the monitoring of the second DCI during the time period between the end of the reception of the first DCI and the start of the transmission or reception of the TB scheduled by the first DCI, based on the number of TBs scheduled by the first DCI being equal to or greater than the specific number.

According to another aspect of the present disclosure, a UE configured to operate in a wireless communication system supporting multi-TB scheduling may include a transceiver, and a processor configured to perform operations by controlling the transceiver. The operations may include receiving a first DCI, monitoring second DCI during a time period between the end of the reception of the first DCI and the start of transmission or reception of a TB scheduled by the first DCI, based on the number of TBs scheduled by the first DCI being less than a specific number, and skipping the monitoring of the second DCI during the time period between the end of the reception of the first DCI and the start of the transmission or reception of the TB scheduled by the first DCI, based on the number of TBs scheduled by the first DCI being equal to or greater than the specific number.

According to a third aspect of the present disclosure, a computer-readable storage medium may store instructions which when executed by a processor, cause the processor to perform operations. The operations may include receiving a first DCI, monitoring second DCI during a time period between the end of the reception of the first DCI and the start of transmission or reception of a TB scheduled by the first DCI, based on the number of TBs scheduled by the first DCI being less than a specific number, and skipping the monitoring of the second DCI during the time period between the end of the reception of the first DCI and the start of the transmission or reception of the TB scheduled by the first DCI, based on the number of TBs scheduled by the first DCI being equal to or greater than the specific number.

The specific number may be 2 based on the wireless communication system supporting narrowband Internet of things (NB-IoT).

The specific number may be 8 based on the wireless communication system supporting machine type communication (MTC) and the UE operating in coverage enhancement (CE) mode A.

The specific number may be 4 based on the wireless communication system supporting MTC and the UE operating in CE mode B.

Based on the number of TBs scheduled by the first DCI being less than the specific number, the monitoring of the second DCI may be skipped during a specific time period before the transmission or reception of the TB scheduled by the first DCI.

The method or the operations may further include receiving the TB scheduled by the first DCI, and receiving a TB scheduled by the second DCI based on detection of the second DCI.

The method or the operations may further include transmitting the TB scheduled by the first DCI, and transmitting a TB scheduled by the second DCI based on detection of the second DCI.

According to the present disclosure, a signal may be efficiently transmitted and received in a wireless communication system supporting multi-transport block (multi-TB) scheduling.

According to the present disclosure, more particularly, a downlink control channel or downlink control information (DCI) may be efficiently transmitted and received in a wireless communication system supporting multi-TB scheduling.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Figure 1:
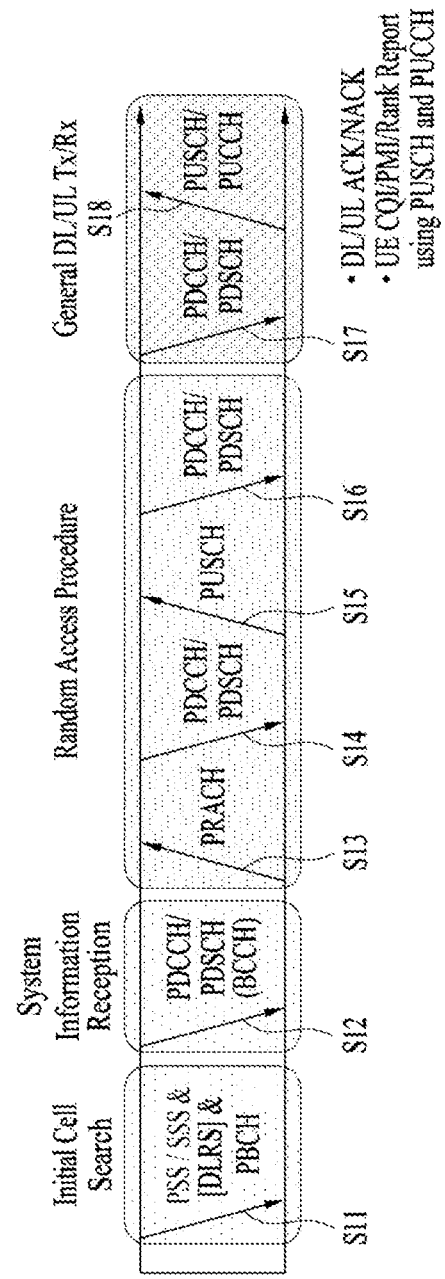
FIG. 1 is a diagram illustrating physical channels and a general signal transmission in a 3rd generation partnership project (3GPP) system.

In the following description, downlink (DL) refers to communication from a base station (BS) to a user equipment (UE), and uplink (UL) refers to communication from the UE to the BS. In the case of DL, a transmitter may be a part of the BS, and a receiver may be a part of the UE. In the case of UL, a transmitter may be a part of the UE, and a receiver may be a part of the BS.

The technology described herein is applicable to various wireless access systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented as radio technology such as universal terrestrial radio access (UTRA) or CDMA2000. The TDMA may be implemented as radio technology such as global system for mobile communications (GSM), general packet radio service (GPRS), or enhanced data rates for GSM evolution (EDGE). The OFDMA may be implemented as radio technology such as the Institute of Electrical and Electronics Engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). The 3rd generation partnership project (3GPP) long term evolution (LTE) is a part of an evolved UMTS (E-UMTS) using the E-UTRA. LTE-advance (LTE-A) or LTE-A pro is an evolved version of the 3GPP LTE. 3GPP new radio or new radio access technology (3GPP NR) or 5G is an evolved version of the 3GPP LTE, LTE-A, or LTE-A pro.

Although the present disclosure is described based on 3GPP communication systems (e.g., LTE-A, NR, etc.) for clarity of description, the spirit of the present disclosure is not limited thereto. The LTE refers to the technology beyond 3GPP technical specification (TS) 36.xxx Release 8. In particular, the LTE technology beyond 3GPP TS 36.xxx Release 10 is referred to as the LTE-A, and the LTE technology beyond 3GPP TS 36.xxx Release 13 is referred to as the LTE-A pro. The 3GPP 5G means the technology beyond TS 36.xxx Release 15 and 3GPP NR refers to the technology beyond 3GPP TS 38.xxx Release 15. The LTE/NR may be called '3GPP system'. Herein, "xxx" refers to a standard specification number. The LTE/NR may be commonly referred to as '3GPP system'. Details of the background, terminology, abbreviations, etc. used herein may be found in documents published before the present disclosure. For example, the following documents may be referenced.

3GPP LTE
  36.211: Physical channels and modulation
  36.212: Multiplexing and channel coding
  36.213: Physical layer procedures
  36.300: Overall description
  36.304: User Equipment (UE) procedures in idle mode
  36.331: Radio Resource Control (RRC)
3GPP NR
  38.211: Physical channels and modulation
  38.212: Multiplexing and channel coding
  38.213: Physical layer procedures for control
  38.214: Physical layer procedures for data
  38.300: NR and NG-RAN Overall Description 38.304: User Equipment (UE) procedures in Idle mode and RRC Inactive state 36.331: Radio Resource Control (RRC) protocol specification Evolved UMTS terrestrial radio access network (E-UTRAN), LTE, LTE-A, LTE-A pro, and 5th generation (5G) systems may be generically called an LTE system. A next generation radio access network (NG-RAN) may be referred to as an NR system. A UE may be fixed or mobile. The term UE is interchangeably used with other terms such as terminal, mobile station (MS), user terminal (UT), subscriber station (SS), mobile terminal (MT), and wireless device. A BS is generally a fixed station communicating with a UE. The term BS is interchangeably used with other terms such as evolved Node B (eNB), general Node B (gNB), base transceiver system (BTS), and access point (AP).

A. Physical Channels and Frame Structures

Physical Channels and General Signal Transmission

FIG. 1 is a diagram illustrating physical channels and a general signal transmission procedure in a 3GPP system. In a wireless communication system, a UE receives information from a BS on DL and transmits information to the BS on UL. The information transmitted and received between the UE and the BS includes data and various types of control information. There are many physical channels according to the types/uses of information transmitted and received between BS and the UE.

When a UE is powered on or enters a new cell, the UE performs initial cell search including acquisition of synchronization with a BS (S11). For the initial cell search, the UE synchronizes its timing with the BS and acquires information such as a cell identifier (ID) by receiving a primary synchronization signal (PSS) and a secondary synchronization signal (SSS) from the BS. The UE may further acquire information broadcast in the cell by receiving a physical broadcast channel (PBCH) from the BS. During the initial cell search, the UE may further monitor a DL channel state by receiving a downlink reference signal (DL RS).

After the initial cell search, the UE may acquire more detailed system information by receiving a physical downlink control channel (PDCCH) and receiving a physical downlink shared channel (PDSCH) corresponding to the PDCCH (S12).

Subsequently, to complete the connection to the BS, the UE may perform a random access procedure (see FIG. 2 and a related description) with the BS (S13 to S16). Specifically, the UE may transmit a random access preamble on a physical random access channel (PRACH) (S13) and may receive a PDCCH and a random access response (RAR) to the preamble on a PDSCH corresponding to the PDCCH (S14). The UE may then transmit a physical uplink shared channel (PUSCH) by using scheduling information included in the RAR (S15), and perform a contention resolution procedure including reception of a PDCCH and a PDSCH corresponding to the PDCCH (S16).

After the above procedure, the UE may receive a PDCCH and/or a PDSCH from the BS (S17) and transmit a PUSCH and/or a physical uplink control channel (PUCCH) to the BS (S18) in a general UL/DL signal transmission procedure. Control information that the UE transmits to the BS is generically called uplink control information (UCI). The UCI includes a hybrid automatic repeat and request acknowledgement/negative acknowledgement (HARQ ACK/NACK), a scheduling request (SR), and channel state information (CSI). The CSI includes a channel quality indicator (CQI), a precoding matrix indicator (PMI), a rank indication (RI), and so on. In general, UCI is transmitted on the PUCCH. However, if control information and data should be transmitted simultaneously, the control information may be transmitted on the PUSCH. In addition, the UE may transmit the UCI aperiodically on the PUSCH, upon receipt of a request/command from a network.

Figure 2:
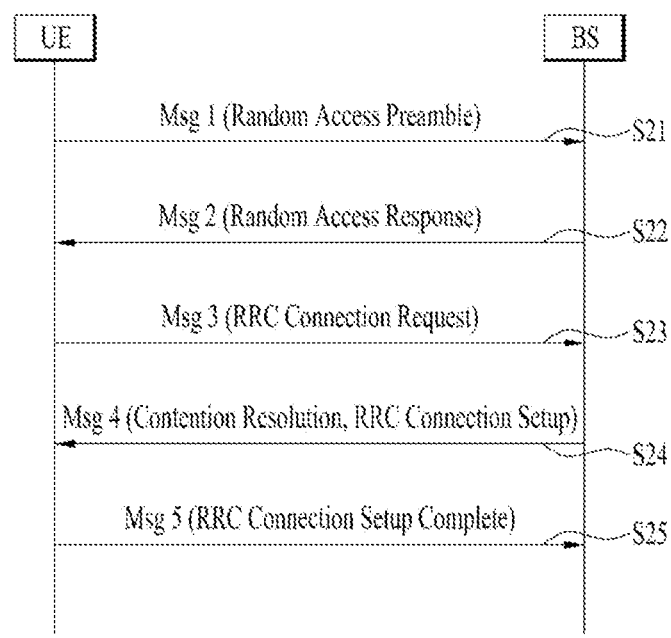
FIG. 2 is a diagram illustrating a random access procedure.

FIG. 2 is a diagram illustrating a random access procedure.

The random access procedure is performed during initial access in RRC idle mode (or RRC_IDLE state), during initial access after radio link failure (RLF), during handover requiring the random access procedure, or upon generation of UL/DL data requiring the random access procedure in RRC connected mode (or RRC CONNECTED state). The random access procedure may also be referred to as a random access channel (RACH) procedure. Some RRC messages such as an RRC Connection Request message, a Cell Update message, and a URA Update message are also transmitted in the random access procedure. Logical channels, common control channel (CCCH), dedicated control channel (DCCH), and dedicated traffic channel (DTCH) may be mapped to a transport channel RACH. The transport channel RACH is mapped to a physical channel PRACH. When the medium access control (MAC) layer of a UE indicates PRACH transmission to the physical layer of the UE, the physical layer of the UE selects one access slot and one signature and transmits a PRACH preamble on UL. The random access procedure is contention-based or contention-free.

Referring to FIG. 2, a UE receives random access information in system information from a BS and stores the random access information. Subsequently, when random access is required, the UE transmits a random access preamble (message 1 or Msg1) to the BS (S21). The random access preamble may also be referred to as an RACH preamble or a PRACH preamble. Upon receipt of the random access preamble from the UE, the BS transmits an RAR (message 2 or Msg2) to the UE (S22). Specifically, DL scheduling information for the RAR may be cyclic redundancy check (CRC)-masked with a random access RNTI (RA-RNTI) and transmitted on an L1/L2 control channel (PDCCH). Upon receipt of the DL scheduling signal masked with the RA-RNTI, the UE may receive the RAR on a PDSCH and decode the RAR. The UE then checks whether the RAR includes RAR information directed to the UE. The UE may determine whether the RAR includes the random access preamble ID (RAID) of the transmitted preamble to check whether the RAR includes RAR information directed to the UE. The RAR includes a timing advance (TA) which is timing offset information for synchronization, radio resource allocation information for UL, and a temporary ID (e.g., temporary cell RNTI (C-RNTI)) for UE identification. Upon receipt of the RAR, the UE performs a UL transmission (message 3 or Msg3) including an RRC Connection Request message on a UL shared channel according to the radio resource allocation information included in the RAR (S23). After receiving the UL transmission from the UE, the BS transmits a message for contention resolution (message 4 or Msg4) to the UE (S24). The message for contention resolution may be referred to as a contention resolution message and include an RRC Connection Setup message. After receiving the contention resolution message from the BS, the UE completes the connection setup and then transmits a Connection Setup Complete message (message 5 or Msg5) to the BS (S25).

In a contention-free random access (CFRA) procedure, before the UE transmits the random access preamble (S21), the BS may allocate a contention-free random access preamble to the UE. The contention-free random access preamble may be allocated by a handover command or dedicated signaling such as a PDCCH. When the contention-free random access preamble is allocated to the UE, the UE may transmit the allocated contention-free random access preamble to the BS in a similar manner to in step S21. Upon receipt of the contention-free random access preamble from the UE, the BS may transmit an RAR to the UE in a similar manner to in step S22.

Radio Frame Structures

Figure 3:
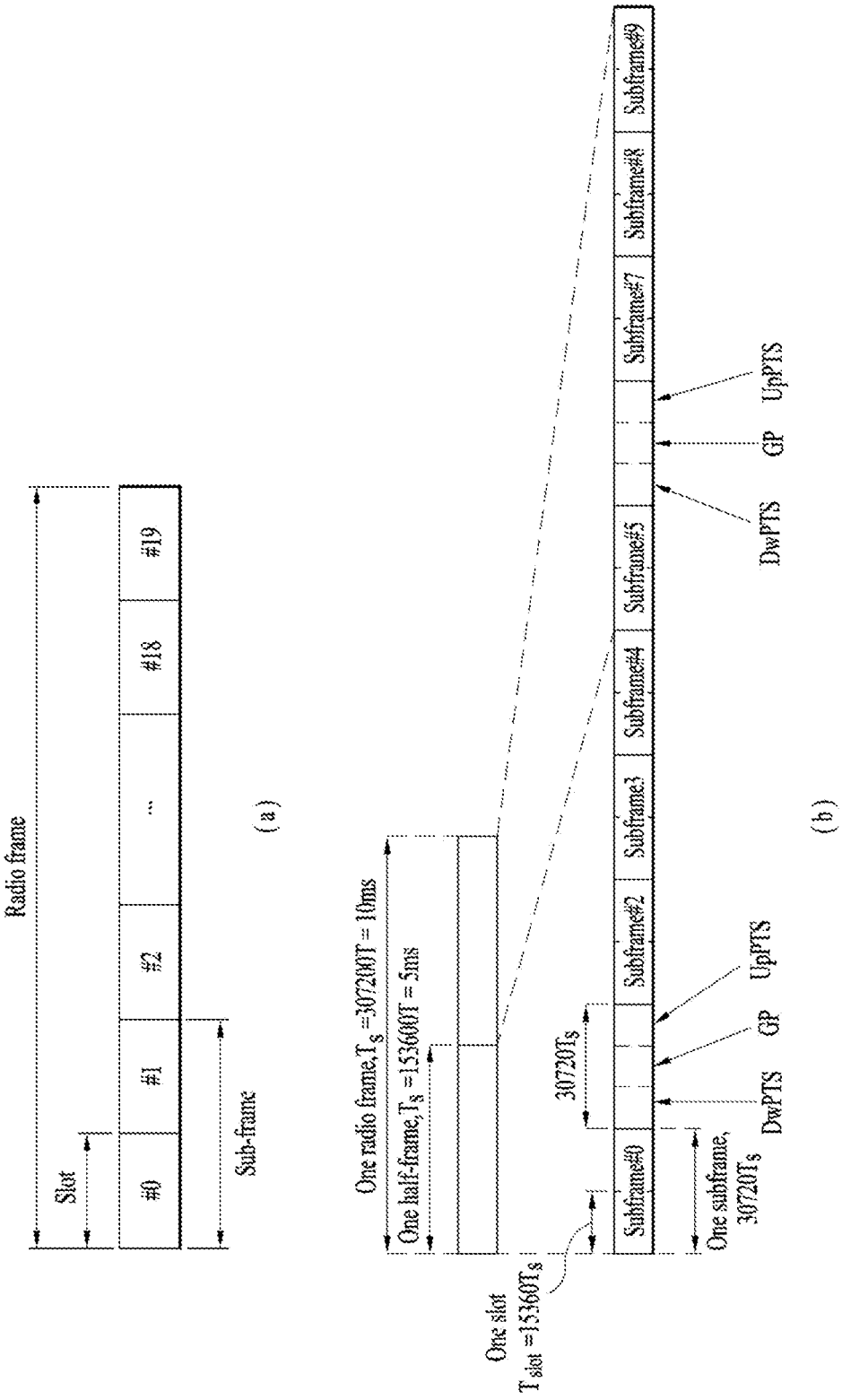
FIG. 3 is a diagram illustrating an LTE radio frame structure.

FIG. 3 illustrates LTE radio frame structures. LTE supports frame type 1 for frequency division duplex (FDD), frame type 2 for time division duplex (TDD), and frame type 3 for an unlicensed cell (UCell). Up to 31 secondary cells (SCells) may be aggregated in addition to a primary cell (PCell). Unless otherwise specified, operations described in the disclosure may be applied independently on a cell basis. In multi-cell aggregation, different frame structures may be used for different cells. Further, time resources (e.g., a subframe, a slot, and a subslot) within a frame structure may be generically referred to as a time unit (TU).

FIG. 3(a) illustrates frame type 1. A DL radio frame is defined by 10 1-ms subframes (SFs). A subframe includes 14 or 12 symbols according to a cyclic prefix (CP). In a normal CP case, a subframe includes 14 symbols, and in an extended CP case, a subframe includes 12 symbols. Depending on multiple access schemes, a symbol may be an OFDM(A) symbol or an SC-FDM(A) symbol. For example, a symbol may refer to an OFDM(A) symbol on DL and an SC-FDM(A) symbol on UL. An OFDM(A) symbol may be referred to as a cyclic prefix-OFDMA(A) (CP-OFDM(A)) symbol, and an SC-FMD(A) symbol may be referred to as a discrete Fourier transform-spread-OFDM(A) (DFT-s-OFDM(A)) symbol.

FIG. 3(b) illustrates frame type 2. Frame type 2 includes two half frames. A half frame includes 4 (or 5) general subframes and 1 (or 0) special subframe. According to a UL-DL configuration, a general subframe is used for UL or DL. A subframe includes two slots.

The above-described radio frame structures are merely exemplary, and the number of subframes in a radio frame, the number of slots in a subframe, and the number of symbols in a slot may vary.

Figure 4:
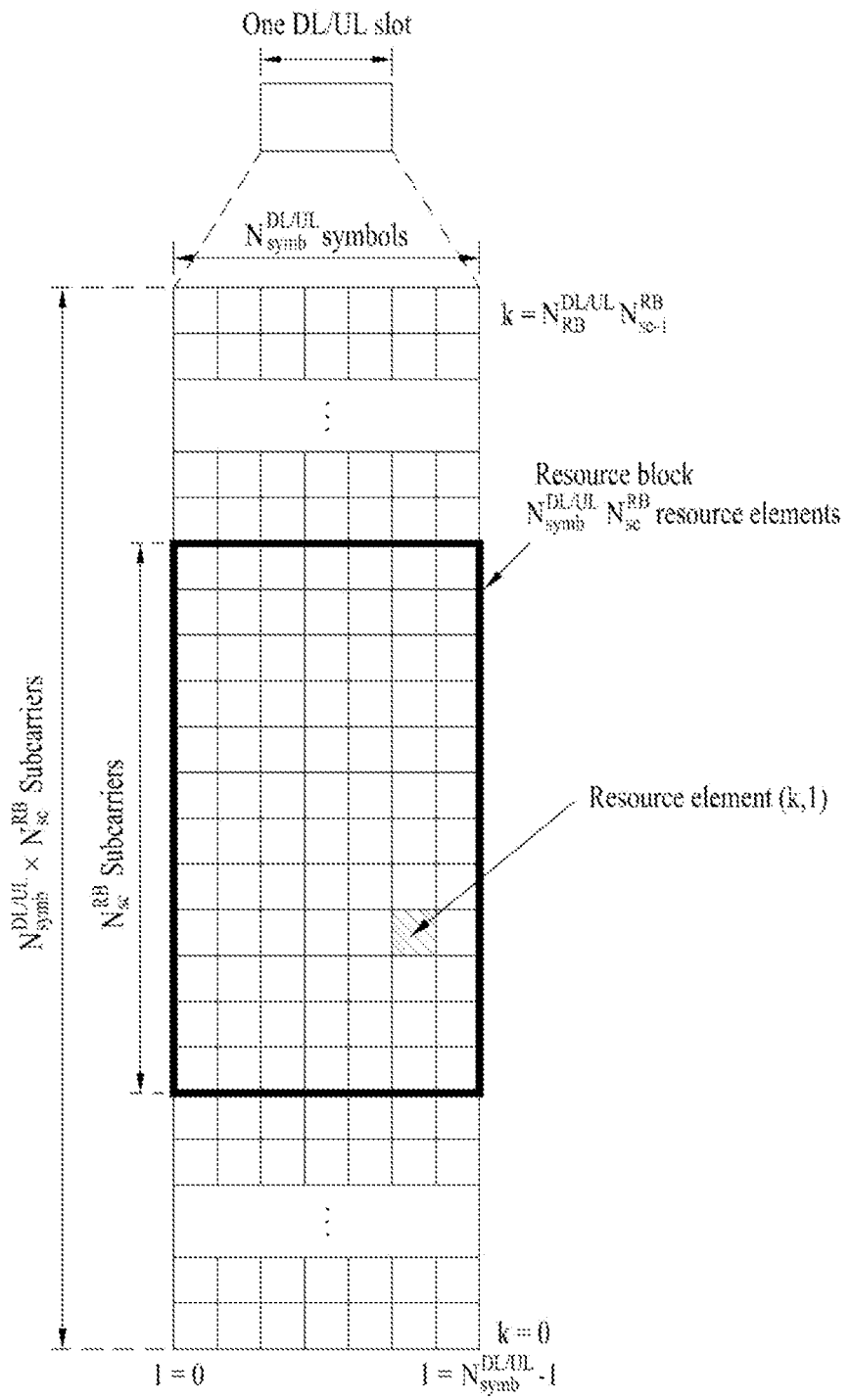
FIG. 4 is a diagram illustrating a slot structure of an LTE frame.

FIG. 4 is a diagram illustrating a slot structure in an LTE frame.

Referring to FIG. 4, a slot includes a plurality of symbols in the time domain by a plurality of resource blocks (RBs) in the frequency domain. A symbol may refer to a symbol duration. A slot structure may be represented as a resource grid including $N^{DL/UL}_{RB} \times N^{RB}_{sc}$ subcarriers and $N^{DU/UL}_{symb}$ symbols. $N^{DL}_{RB}$ represents the number of RBs in a DL slot, and $N^{UL}_{RB}$ represents the number of RBs in a UL slot. $N^{DL}_{RB}$ and $N^{UL}_{RB}$ are dependent on a DL bandwidth and a UL bandwidth, respectively. $N^{DL}_{symb}$ represents the number of symbols in the DL slot, and $N^{UL}_{symb}$ represents the number of symbols in the UL slot. $N^{RB}_{sc}$ represents the number of subcarriers in one RB. The number of symbols in a slot may vary according to a subcarrier spacing (SCS) and a CP length. For example, one slot includes 7 symbols in the normal CP case, whereas one slot includes 6 symbols in the extended CP case.

An RB is defined as $N^{DL/UL}_{symb}$ (e.g., 7) consecutive symbols in the time domain by $N^{RB}_{sc}$ (e.g., 12) consecutive subcarriers in the frequency domain. The RB may be a physical resource block (PRB) or a virtual resource block (VRB), and PRBs may be mapped to VRBs in a one-to-one correspondence. Two RBs each being located in one of the two slots of a subframe may be referred to as an RB pair. The two RBs of an RB pair may have the same RB number (or RB index). A resource including one symbol by one subcarrier is referred to as a resource element (RE) or tone. Each RE of a resource grid may be uniquely identified by an index pair (k, l) in a slot where k is a frequency-domain index ranging from 0 to $N^{DL/UL}_{RB} \times N^{RB}_{sc} - 1$ and l is a time-domain index ranging from 0 to $N^{DL/UL}_{symb} - 1$.

Figure 5:
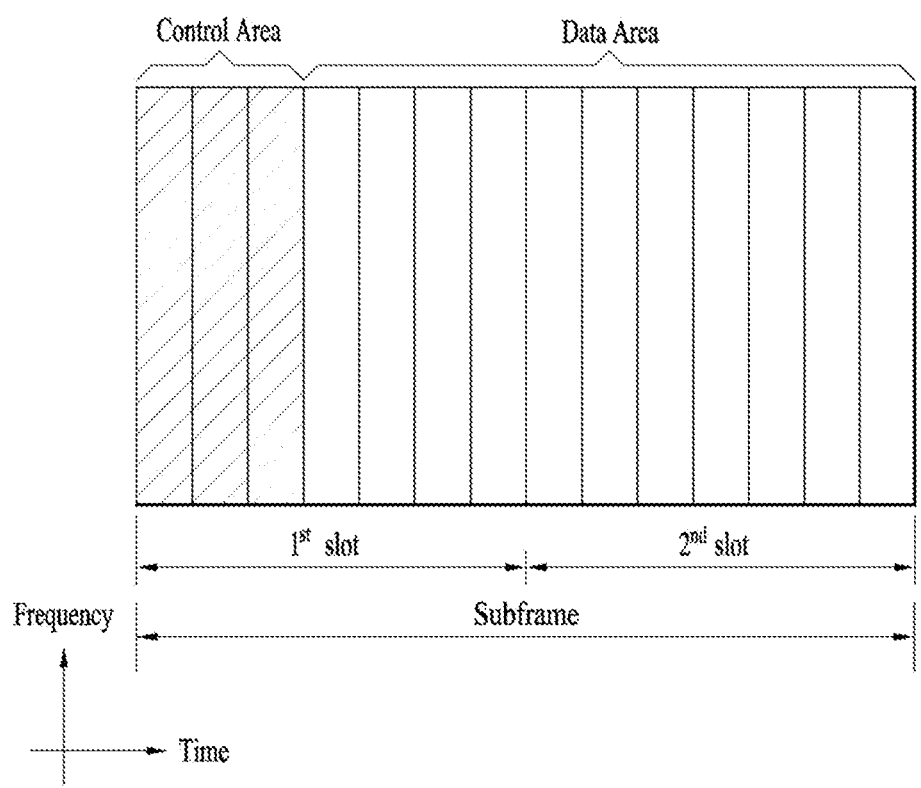
FIG. 5 is a diagram illustrating a downlink (DL) subframe structure in an LTE system.

FIG. 5 illustrates a DL frame structure used in an LTE system.

Referring to FIG. 5, up to three (or four) OFDM(A) symbols at the beginning of the first slot of a subframe correspond to a control region. The remaining OFDM(A) symbols correspond to a data region in which a PDSCH is allocated, and a basic resource unit of the data region is an RB. DL control channels include physical control format indicator channel (PCFICH), PDCCH, physical hybrid-ARQ indicator channel (PHICH), and so on. The PCFICH is transmitted in the first OFDM symbol of a subframe, conveying information about the number of OFDM symbols used for transmission of control channels in the subframe. The PHICH is a response to a UL transmission, conveying an HARQ ACK/NACK signal. Control information delivered on the PDCCH is called downlink control information (DCI). The DCI includes UL resource allocation information, DL resource control information, or a UL transmit power control command for any UE group.

Figure 6:
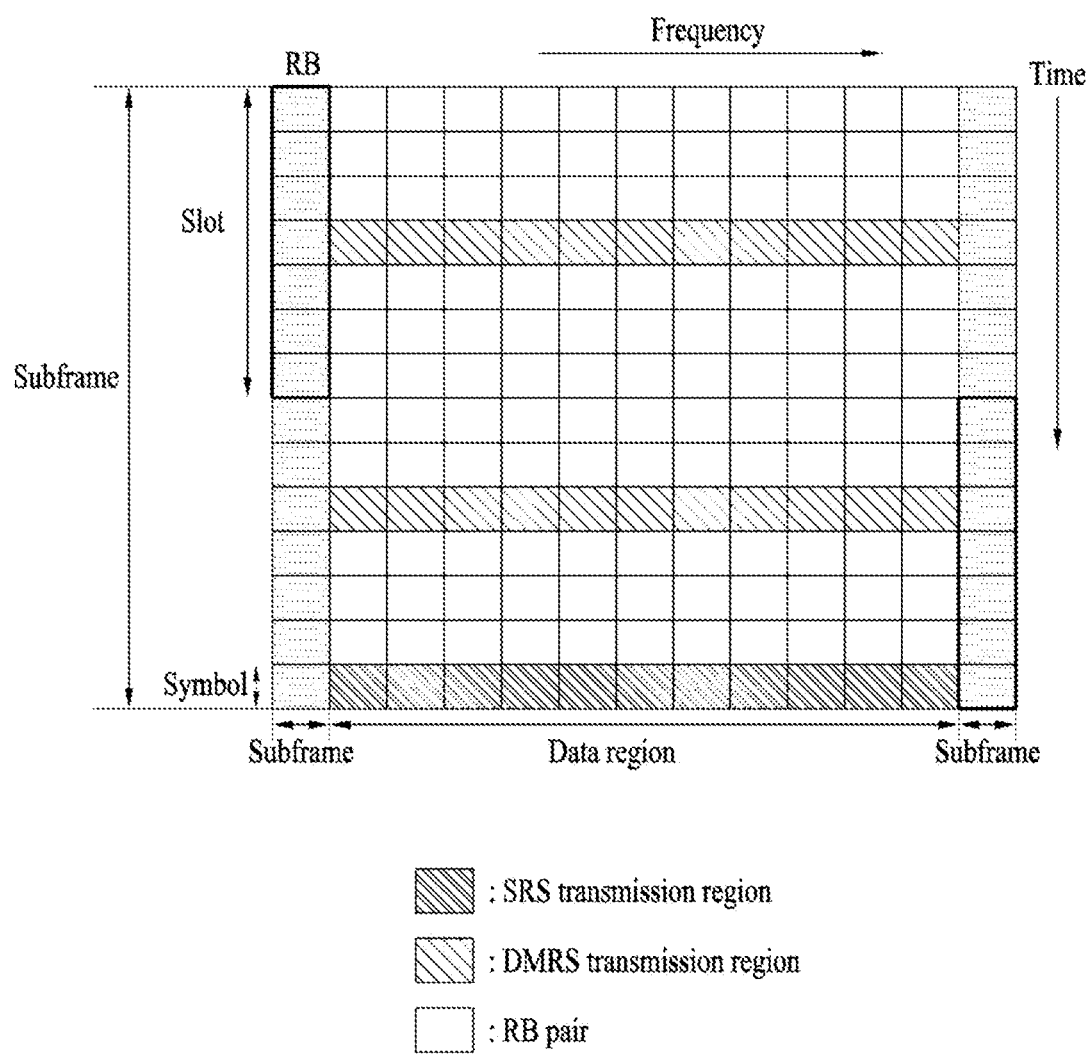
FIG. 6 is a diagram illustrating an uplink (UL) subframe structure in the LTE system.

FIG. 6 illustrates a UL frame structure used in the LTE system.

Referring to FIG. 6, a subframe includes two 0.5-ms slots. Each slot includes a plurality of symbols, each corresponding to one SC-FDMA symbol. An RB is a resource allocation unit corresponding to 12 subcarriers in the frequency domain by one slot in the time domain. An LTE UL subframe is divided largely into a control region and a data region. The data region is communication resources used for each UE to transmit data such as voice, packets, and so on, including a PUSCH. The control region is communication resources used for each UE to transmit a DL channel quality report, an ACK/NACK for a DL signal, a UL scheduling request, and so on, including a PUCCH. A sounding reference signal (SRS) is transmitted in the last SC-FDMA symbol of a subframe in the time domain.

Figure 7:
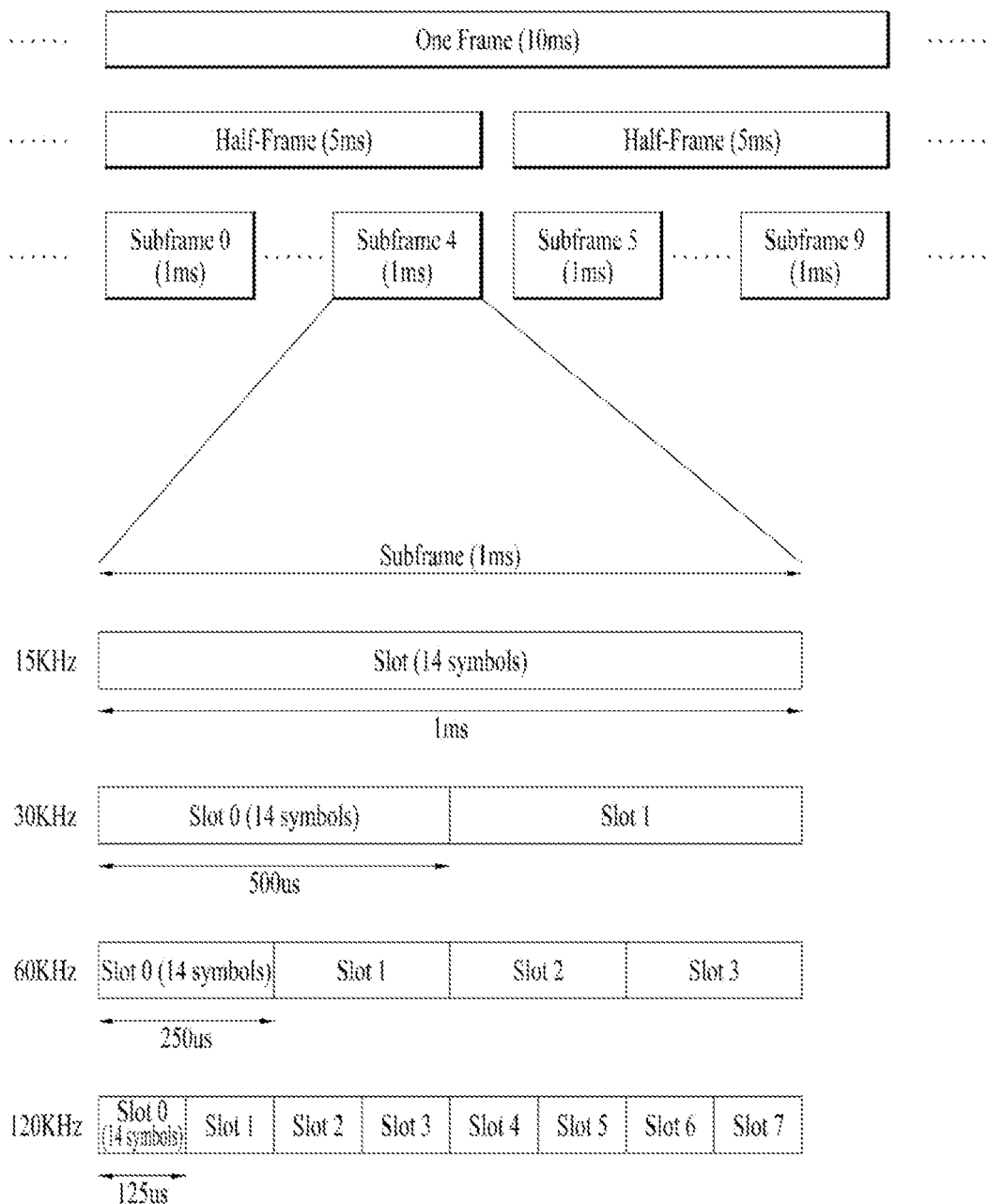
FIG. 7 is a diagram illustrating a radio frame structure in a new radio (NR) system.

FIG. 7 illustrates a radio frame structure used in an NR system.

In NR, UL and DL transmissions are configured in frames. Each radio frame has a length of 10 ms and is divided into two 5-ms half frames (HFs). Each half frame is divided into five 1-ms subframes. A subframe is divided into one or more slots, and the number of slots in a subframe depends on an SCS. Each slot includes 12 or 14 OFDM(A) symbols according to a CP. When a normal CP is used, each slot includes 14 OFDM symbols. When an extended CP is used, each slot includes 12 OFDM symbols. A symbol may include an OFDM symbol (CP-OFDM symbol) and an SC-FDMA symbol (or DFT-s-OFDM symbol).

Table 1 exemplarily illustrates that the number of symbols per slot, the number of slots per frame, and the number of slots per subframe vary according to SCSs in the normal CP case.

TABLE 1

| SCS ($15 \times 2^\mu$) | $N_{symb}^{slot}$ | $N_{slot}^{frame,\mu}$ | $N_{slot}^{subframe,\mu}$ |
|---|---|---|---|
| 15 KHz ($\mu = 0$) | 14 | 10 | 1 |
| 30 KHz ($\mu = 1$) | 14 | 20 | 2 |
| 60 KHz ($\mu = 2$) | 14 | 40 | 4 |
| 120 KHz ($\mu = 3$) | 14 | 80 | 8 |
| 240 KHz ($\mu = 4$) | 14 | 160 | 16 |

$N_{symb}^{slot}$: number of symbols in a slot
$N_{slot}^{frame,u}$: number of slots in a frame
$N_{slot}^{subframe,u}$: number of slots in a subframe Table 2 illustrates that the number of symbols per slot, the number of slots per frame, and the number of slots per subframe vary according to SCSs in the extended CP case.

TABLE 2

| SCS ($15 \times 2^\mu$) | $N_{symb}^{slot}$ | $N_{slot}^{frame,\mu}$ | $N_{slot}^{subframe,\mu}$ |
|---|---|---|---|
| 60 KHz ($\mu = 2$) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a TU) including the same number of symbols may be configured differently for the aggregated cells.

Figure 8:
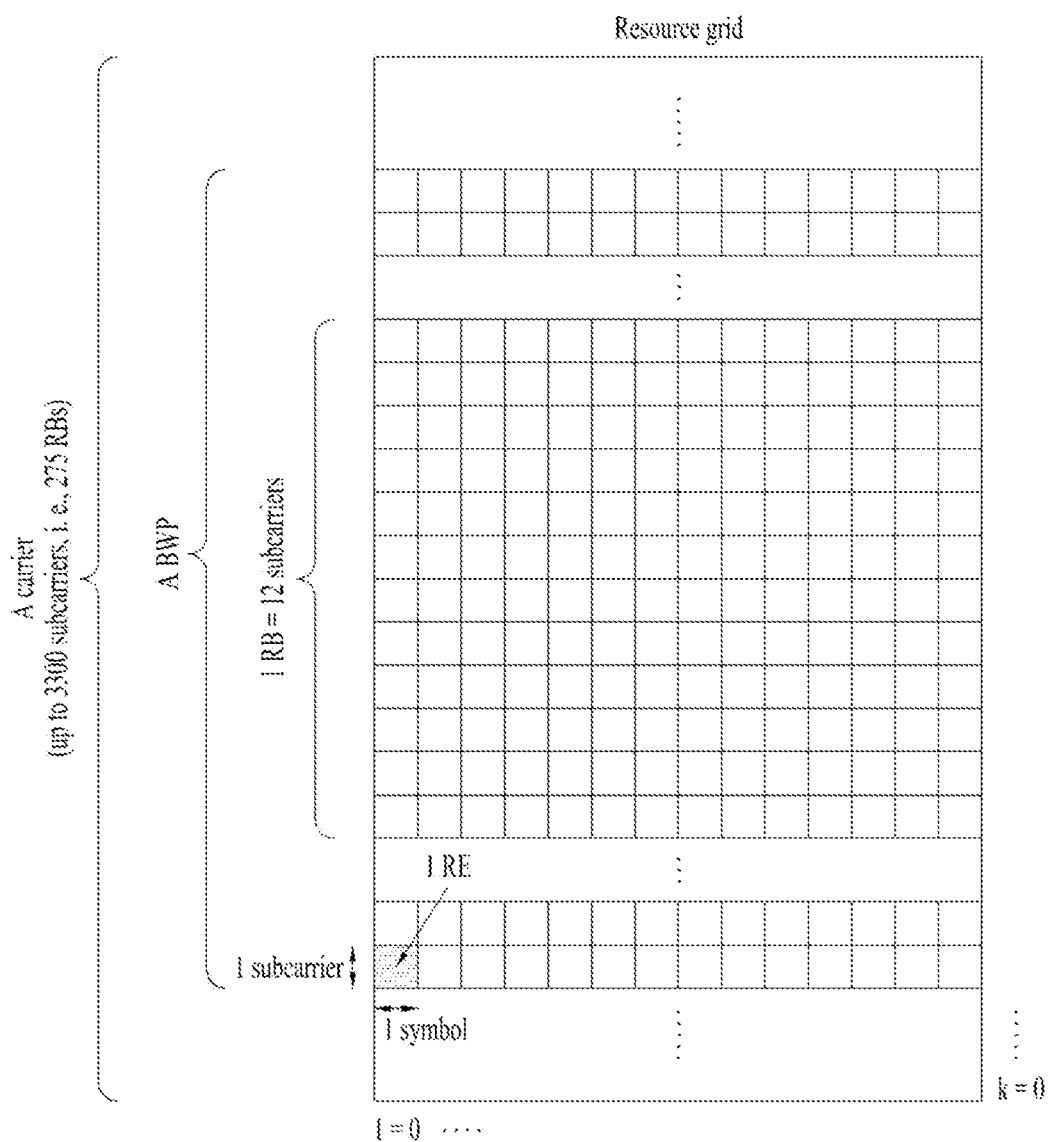
FIG. 8 is a diagram illustrating a slot structure of an NR frame.

FIG. 8 illustrates a slot structure of an NR frame.

A slot includes a plurality of symbols in the time domain. For example, one slot includes 14 symbols in the normal CP case and 12 symbols in the extended CP case. A carrier includes a plurality of subcarriers in the frequency domain. An RB may be defined by a plurality of (e.g., 12) consecutive subcarriers in the frequency domain. A bandwidth part (BWP) may be defined by a plurality of consecutive (P)RBs in the frequency domain and correspond to one numerology (e.g., SCS, CP length, and so on). A carrier may include up to N (e.g., 5) BWPs. Data communication may be conducted in an active BWP, and only one BWP may be activated for one UE. Each element of a resource grid may be referred to as an RE, to which one complex symbol may be mapped.

B. UL and DL Channels

DL Channels

A BS transmits related signals on DL channels to a UE, and the UE receives the related signals on the DL channels from the BS.

(1) Physical Downlink Shared Channel (PDSCH)

The PDSCH delivers DL data (e.g., a DL shared channel transport block (DL-SCH TB)) and adopts a modulation scheme such as quadrature phase shift keying (QPSK), 16-ary quadrature amplitude modulation (16 QAM), 64-ary QAM (64 QAM), or 256-ary QAM (256 QAM). A TB is encoded to a codeword. The PDSCH may deliver up to two codewords. The codewords are individually subjected to scrambling and modulation mapping, and modulation symbols from each codeword are mapped to one or more layers. An OFDM signal is generated by mapping each layer together with a demodulation reference signal (DMRS) to resources, and transmitted through a corresponding antenna port.

(2) Physical Downlink Control Channel (PDCCH)

The PDCCH delivers DCI and adopts QPSK as a modulation scheme. One PDCCH includes 1, 2, 4, 8, or 16 control channel elements (CCEs) according to its aggregation level (AL). One CCE includes 6 resource element groups (REGs), each REG being defined by one OFDM symbol by one (P)RB. The PDCCH is transmitted in a control resource set (CORESET). A CORESET is defined as a set of REGs with a given numerology (e.g., an SCS, a CP length, or the like). A plurality of CORESETs for one UE may overlap with each other in the time/frequency domain. A CORESET may be configured by system information (e.g., a master information block (MIB)) or UE-specific higher-layer signaling (e.g., RRC signaling). Specifically, the number of RBs and the number of symbols (3 at maximum) in the CORESET may be configured by higher-layer signaling.

The UE acquires DCI delivered on the PDCCH by decoding (so-called blind decoding) a set of PDCCH candidates. A set of PDCCH candidates decoded by a UE are defined as a PDCCH search space set. A search space set may be a common search space (CSS) or a UE-specific search space (USS). The UE may acquire DCI by monitoring PDCCH candidates in one or more search space sets configured by an MIB or higher-layer signaling. Each CORESET configuration is associated with one or more search space sets, and each search space set is associated with one CORESET configuration. One search space set is determined based on the following parameters.

controlResourceSetId: A set of control resources related to the search space set.
monitoringSlotPeriodicityAndOffset: A PDCCH monitoring periodicity (in slots) and a PDCCH monitoring offset (in slots).
monitoringSymbolsWithinSlot: A PDCCH monitoring pattern (e.g., the first symbol(s) in a CORESET) in a PDCCH monitoring slot.
nrofCandidates: The number of PDCCH candidates (one of 0, 1, 2, 3, 4, 5, 6, and 8) for each AL={1, 2, 4, 8, 16}.

Table 3 lists exemplary features of each search space type.

TABLE 3

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |

TABLE 3-continued

| Type | Search Space | RNTI | Use Case |
|---|---|---|---|
| | UE Specific | C-RNTI, or MCS-C-RNTI, or CS-RNTI(s) | User specific PDSCH decoding |

Table 4 lists exemplary DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH. DCI format 2_0 is used to deliver dynamic slot format information (e.g., a dynamic slot format indicator (SFI)) to a UE, and DCI format 2_1 is used to deliver DL preemption information to a UE. DCI format 2_0 and/or DCI format 2_1 may be delivered to a corresponding group of UEs on a group common PDCCH which is a PDCCH directed to a group of UEs.

UL Channels

A UE transmits related signals on UL channels to a BS, and the BS receives the related signals on the UL channels from the UE.

(1) Physical Uplink Shared Channel (PUSCH)

The PUSCH delivers UL data (e.g., UL shared channel transport block (UL-SCH TB)) and/or UCI based on a CP-OFDM waveform or a DFT-s-OFDM waveform. When the PUSCH is transmitted in the DFT-s-OFDM waveform, the UE transmits the PUSCH by transform precoding. For example, when transform precoding is impossible (e.g., disabled), the UE may transmit the PUSCH in the CP-OFDM waveform, while when transform precoding is possible (e.g., enabled), the UE may transmit the PUSCH in the CP-OFDM or DFT-s-OFDM waveform. A PUSCH transmission may be scheduled dynamically by a UL grant in DCI, or semi-statically by higher-layer signaling (e.g., RRC signaling) (and/or layer 1 (L1) signaling such as a PDCCH) (configured grant). The PUSCH transmission may be performed in a codebook-based or non-codebook-based manner.

(2) Physical Uplink Control Channel (PUCCH)

The PUCCH delivers UCI, an HARQ ACK, and/or an SR and is classified as a short PUCCH or a long PUCCH according to the transmission duration of the PUCCH. Table 5 lists exemplary PUCCH formats.

TABLE 5

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

C. Machine Type Communication (MTC)

MTC, which is a type of data communication involving one or more machines, may be applied to machine-to-machine (M2M) or Internet of things (IoT). A machine refers to an entity that does not require direct human manipulation or intervention. For example, machines include a smart meter equipped with a mobile communication module, a vending machine, a portable terminal having an MTC function, and so on. For example, services such as meter reading, water level measurement, use of surveillance cameras, and inventory reporting of vending machines may be provided through MTC. MTC has the features of a small amount of transmission data and intermittent UL/DL data transmissions/receptions. Therefore, it is efficient to lower the unit cost of MTC devices and reduce battery consumption in correspondence with low data rates. An MTC device generally has low mobility, and thus MTC is conducted in a channel environment which hardly changes.

The 3GPP has applied MTC since release 10, and MTC may be implemented to satisfy the requirements of low cost and low complexity, coverage enhancement, and low power consumption. For example, 3GPP Release 12 added features for low-cost MTC devices and thus defined UE category 0. A UE category is an indicator indicating the amount of data that a UE may process in a communication modem. A UE of UE category 0 may reduce baseband/radio frequency (RF) complexity by using a reduced peak data rate, a half-duplex operation with relaxed RF requirements, and a single reception (Rx) antenna. In 3GPP Release 12, enhanced MTC (eMTC) was introduced, and the price and power consumption of MTC UEs were further lowered by operating the MTC UEs only at 1.08 MHz (that is, 6 RBs), a minimum frequency bandwidth supported in legacy LTE.

In the following description, the term MTC is interchangeably used with the terms eMTC, LTE-M1/M2, bandwidth reduced low complexity/coverage enhanced (BL/CE), non-BL UE (in enhanced coverage), NR MTC, and enhanced BL/CE, and other equivalent terms. An MTC UE/device covers any terminal/device with MTC functionality (e.g., a smart meter, a vending machine, and a portable terminal with an MTC function).

Figure 9:
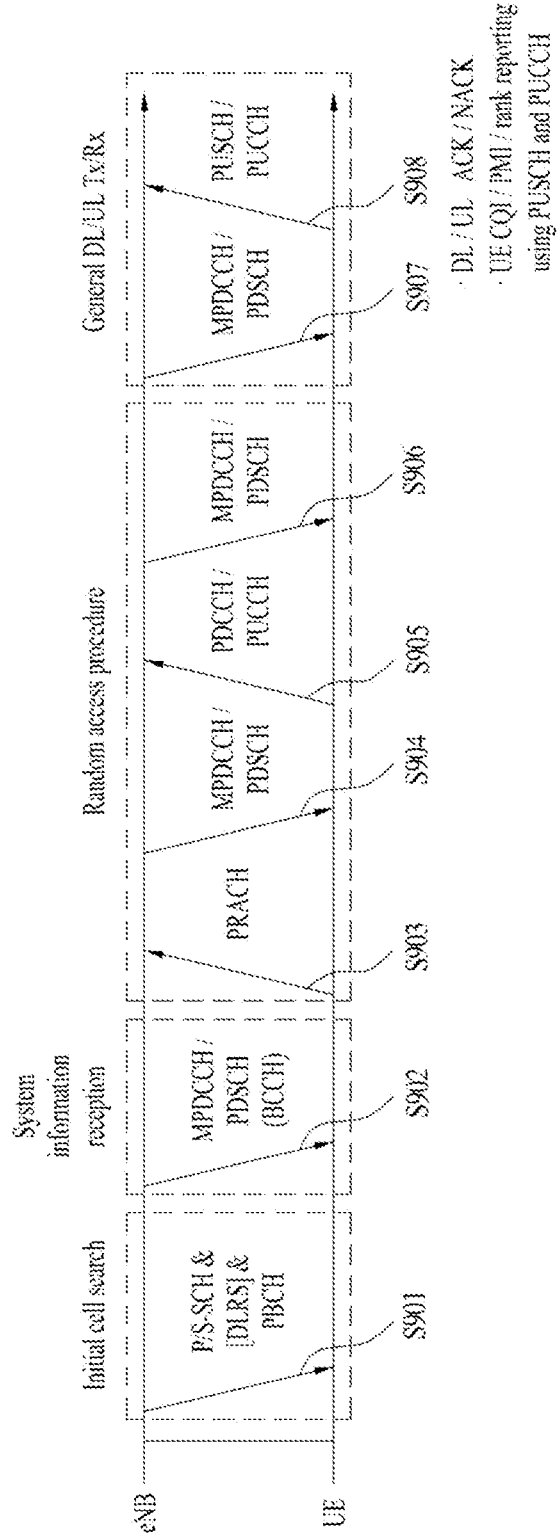
FIG. 9 is a diagram illustrating physical channels and a general signal transmission using the physical channels in machine type communication (MTC)

FIG. 9 illustrates physical channels and a general signal transmission using the physical channels in MTC. In a wireless communication system, an MTC UE receives information on a DL from a BS and transmits information on a UL to the BS. Information transmitted and received between the BS and the UE includes data and various types of control information, and various physical channels are defined according to the types/usages of information carried on the physical channels.

When a UE is powered on or enters a new cell, the UE performs initial cell search including acquisition of synchronization with a BS (S901). For the initial cell search, the UE synchronizes its timing with the BS and acquires information such as a cell ID by receiving a PSS and an SSS from the BS. The PSS/SSS may be the PSS/SSS of legacy LTE. The UE may then acquire information broadcast in the cell by receiving a PBCH from the BS (S902). During the initial cell search, the UE may further monitor a DL channel state by receiving a DL RS.

After the initial cell search, the UE may acquire more detailed system information by receiving a MTC PDCCH (MPDCCH) and receiving a PDSCH corresponding to the MPDCCH (S902).

Subsequently, to complete the connection to the BS, the UE may perform a random access procedure with the BS (S903 to S906). Specifically, the UE may transmit a random access preamble on a PRACH (S903) and may receive a PDCCH and an RAR to the preamble on a PDSCH corresponding to the PDCCH (S904). The UE may then transmit a PUSCH by using scheduling information included in the RAR (S905), and perform a contention resolution procedure including reception of a PDCCH and a PDSCH corresponding to the PDCCH (S906).

After the above procedure, the UE may receive an MPDCCH signal and/or a PDSCH signal from the BS (S907) and transmit a PUSCH signal and/or a PUCCH signal to the BS (S908) in a general UL/DL signal transmission procedure. Control information that the UE transmits to the BS is generically called UCI. The UCI includes an HARQ ACK/NACK, an SR, and CSI. The CSI includes a CQI, a PMI, an RI, and so on.

Figure 10:
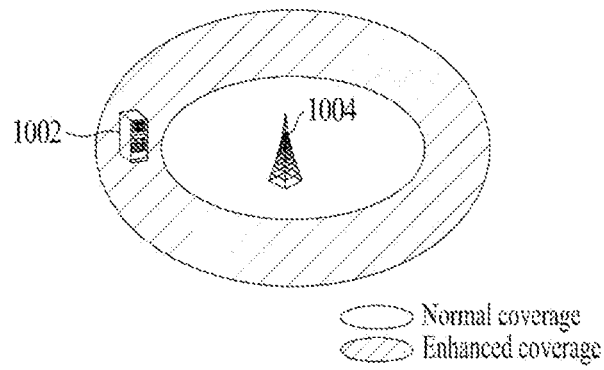
FIG. 10 is a diagram illustrating cell coverage enhancement in MTC.
Figure 10:
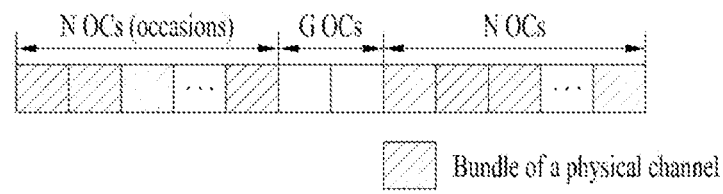

FIG. 10 illustrates cell coverage enhancement in MTC. Coverage enhancement may also be expressed as coverage extension, and a technique for coverage enhancement described in relation to MTC may be applied to NB-IoT and 5G (or NR) in the same/similar manner.

For cell extension or cell enhancement (CE) of a BS 1004 to an MTC device 1002, various CE techniques are under discussion. For example, for CE, the BS/UE may transmit/receive one physical channel/signal in a plurality of occasions (a bundle of physical channels). The physical channel/signal may be repeatedly transmitted/received according to a predefined rule during a bundle interval. A receiver may increase the decoding success rate of the physical channel/signal by decoding some or all of the physical channel/signal bundle. An occasion may mean resources (e.g., time/frequency) in which a physical channel/signal may be transmitted/received. An occasion for a physical channel/signal may include a subframe, a slot, or a symbol set in the time domain. The symbol set may include one or more consecutive OFDM-based symbols. An OFDM-based symbol may include an OFDM(A) symbol and a DFT-s-OFDM(A) (i.e., SC-FDM(A)) symbol. The occasion for a physical channel/signal may include a frequency band or an RB set in the frequency domain. For example, a PBCH, a PRACH, an MTC PDCCH (MPDCCH), a PDSCH, a PUCCH, and a PUSCH may be repeatedly transmitted/received.

MTC supports an operation mode for CE, and a mode supporting repeated transmissions/receptions of a signal for CE may be referred to as a CE mode. The number of repeated transmissions/receptions of a signal for CE may be referred to as a CE level. Table 6 illustrates exemplary CE modes/levels supported in MTC.

TABLE 6

| Mode | Level | Description |
| --- | --- | --- |
| Mode A | Level 1 | No repetition for PRACH |
| | Level 2 | Small Number of Repetition for PRACH |
| Mode B | Level 3 | Medium Number of Repetition for PRACH |
| | Level 4 | Large Number of Repetition for PRACH |

A first mode (e.g., CE Mode A) is defined for small CE, supporting full mobility and CSI feedback, in which no repetition or a small number of repetitions are performed. A first-mode operation may be identical to the operation range of UE category 1. A second mode (e.g., CE Mode B) is defined for UEs in an extremely poor coverage condition, supporting CSI feedback and limited mobility, in which a large number of repeated transmissions are defined. The second mode provides up to 15 dB of CE with respect to the range of UE category 1. Each level of MTC is defined differently for a random access procedure (or RACH procedure) and a paging procedure.

Figure 11:
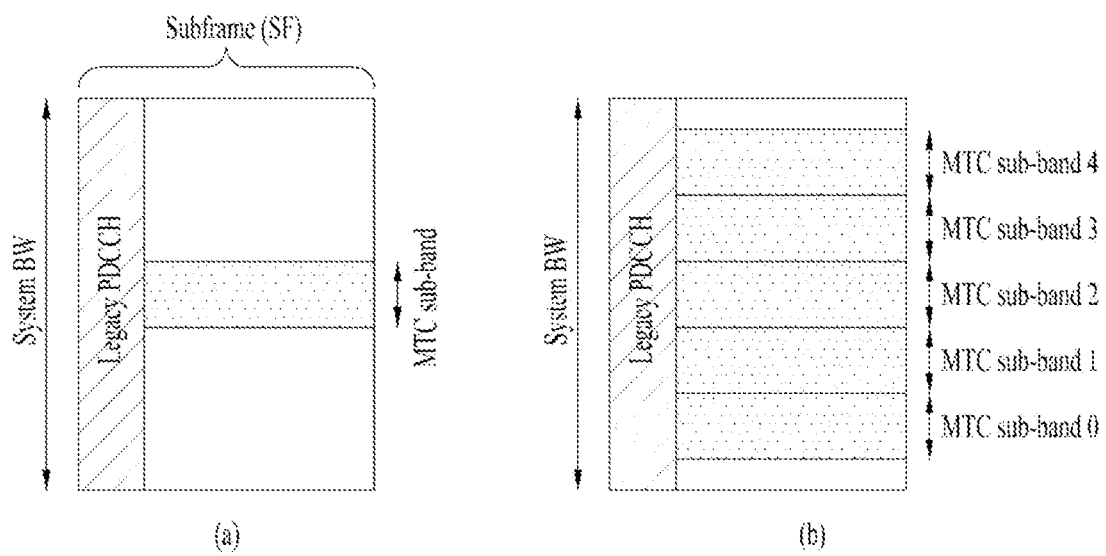
FIG. 11 is a diagram illustrating MTC signal bands.

FIG. 11 illustrates MTC signal bands.

Referring to FIG. 11, to reduce the unit cost of MTC UEs, MTC may be conducted only in a specific band (or channel band) (MTC subband or narrowband (NB)) of the system bandwidth of a cell, regardless of the system bandwidth of the cell. For example, an MTC UE may perform a UL/DL operation only in a 1.08-MHz frequency band. 1.08 MHz corresponds to six consecutive PRBs in the LTE system, and is defined to enable MTC UEs to follow the same cell search and random access procedures as LTE UEs. FIG. 11(a) illustrates an MTC subband configured at the center of a cell (e.g., center 6 PRBs), and FIG. 11(b) illustrates a plurality of MTC subbands configured within a cell. The plurality of MTC subbands may be configured contiguously/non-contiguously in the frequency domain. Physical channels/signals for MTC may be transmitted and received in one MTC subband. In the NR system, an MTC subband may be defined in consideration of a frequency range and an SCS. In the NR system, for example, the size of an MTC subband may be defined as X consecutive PRBs (i.e., $0.18*X*(2^\mu)$ MHz bandwidth) (see Table 1 for $\mu$). X may be set to 20 according to the size of a synchronization signal/physical broadcast channel (SS/PBCH) block. In the NR system, MTC may operate in at least one BWP. A plurality of MTC subbands may be configured in a BWP.

Figure 12:
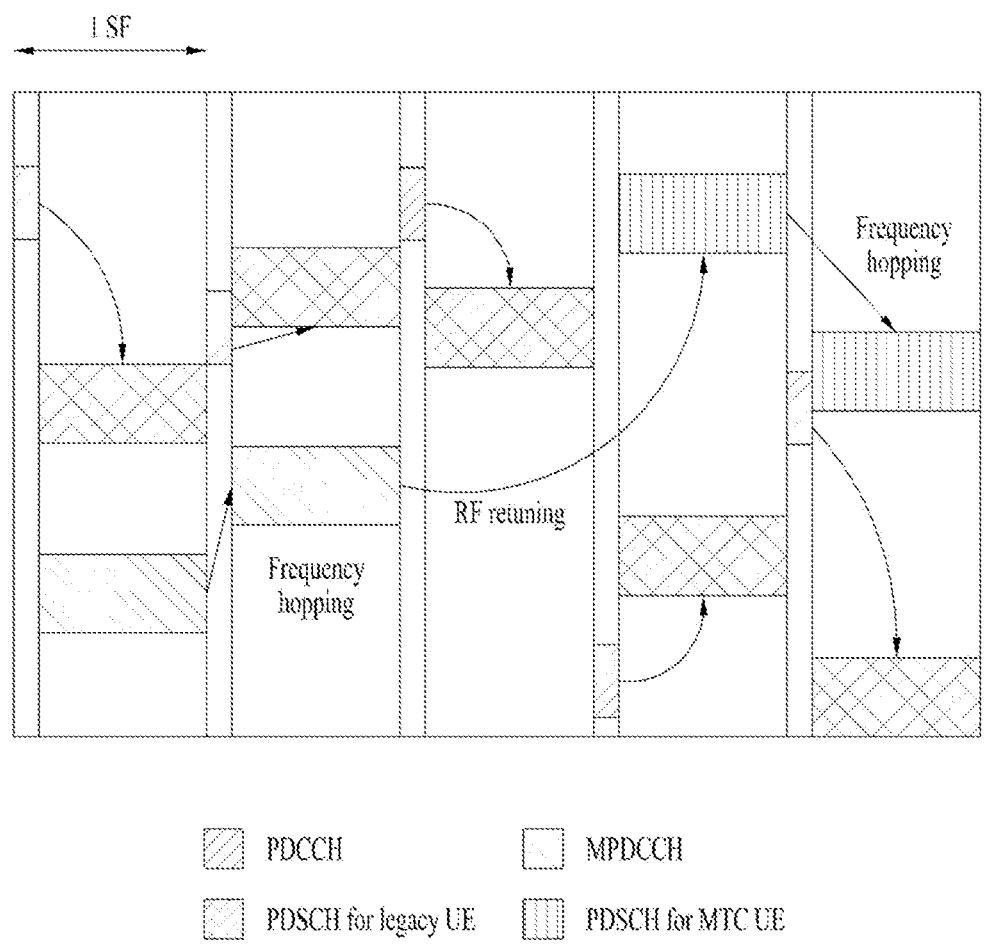
FIG. 12 is a diagram illustrating scheduling in legacy LTE and MTC.

FIG. 12 illustrates scheduling in legacy LTE and MTC.

Referring to FIG. 12, a PDSCH is scheduled by a PDCCH in legacy LTE. Specifically, the PDCCH may be transmitted in the first N OFDM symbols in a subframe (N=1 to 3), and the PDSCH scheduled by the PDCCH is transmitted in the same subframe. In MTC, a PDSCH is scheduled by an MPDCCH. Accordingly, an MTC UE may monitor MPDCCH candidates in a search space within a subframe. The monitoring includes blind decoding of the MPDCCH candidates. The MPDCCH delivers DCI, and the DCI includes UL or DL scheduling information. The MPDCCH is multiplexed with the PDSCH in FDM in a subframe. The MPDCCH is repeatedly transmitted in up to 256 subframes, and the DCI carried in the MPDCCH includes information about an MPDCCH repetition number. In DL scheduling, when the repeated transmissions of the MPDCCH end in subframe #N, transmission of the PDSCH scheduled by the MPDCCH starts in subframe #N+2. The PDSCH may be repeatedly transmitted in up to 2048 subframes. The MPDCCH and the PDSCH may be transmitted in different MTC subbands. In UL scheduling, when the repeated transmissions of the MPDCCH end in subframe #N, transmission of a PUSCH scheduled by the MPDCCH starts in subframe #N+4. For example, when the PDSCH is repeatedly transmitted in 32 subframes, the PDSCH may be transmitted in the first 16 subframes in a first MTC subband, and in the remaining 16 subframes in a second MTC subband. MTC operates in a half-duplex mode. MTC HARQ retransmission is adaptive and asynchronous.

D. Narrowband Internet of Things (NB-IoT)

NB-IoT is a narrowband Internet of things technology supporting a low-power wide area network through an existing wireless communication system (e.g., LTE or NR). Further, NB-IoT may refer to a system supporting low complexity and low power consumption in a narrowband (NB). Since an NB-IoT system uses the same OFDM parameters as those of an existing system, such as an SCS, there is no need to allocate an additional band separately for the NB-IoT system. For example, one PRB of an existing system band may be allocated for NB-IoT. Considering that an NB-IoT UE perceives a single PRB as a carrier, PRB and carrier may be interpreted as the same meaning in the description of NB-IoT.

NB-IoT may operate in a multi-carrier mode. In NB-IoT, a carrier may be defined as an anchor type carrier (i.e., anchor carrier or anchor PRB) or a non-anchor type carrier (i.e., non-anchor carrier or non-anchor PRB). From the perspective of a BS, the anchor carrier may mean a carrier carrying a narrowband PSS (NPSS), a narrowband SSS (NSSS), and a narrowband PBCH (NPBCH) for initial access, and a narrowband PDSCH (NPDSCH) for a narrowband system information block (N-SIB). That is, in NB-IoT, a carrier for initial access may be referred to as an anchor carrier, and the other carrier(s) may be referred to as non-anchor carrier(s). One or more anchor carriers may exist in the system.

While NB-IoT is described mainly in the context of being applied to the legacy LTE system in the present disclosure, the description may be extended to a next-generation system (e.g., NR system). In the present disclosure, the description of NB-IoT may be extended to MTC serving a similar technical purpose (e.g., low-power, low-cost, and CE). The term NB-IoT may be replaced with other equivalent terms such as NB-LTE, NB-IoT enhancement, enhanced NB-IoT, further enhanced NB-IoT, and NB-NR.

Figure 13:
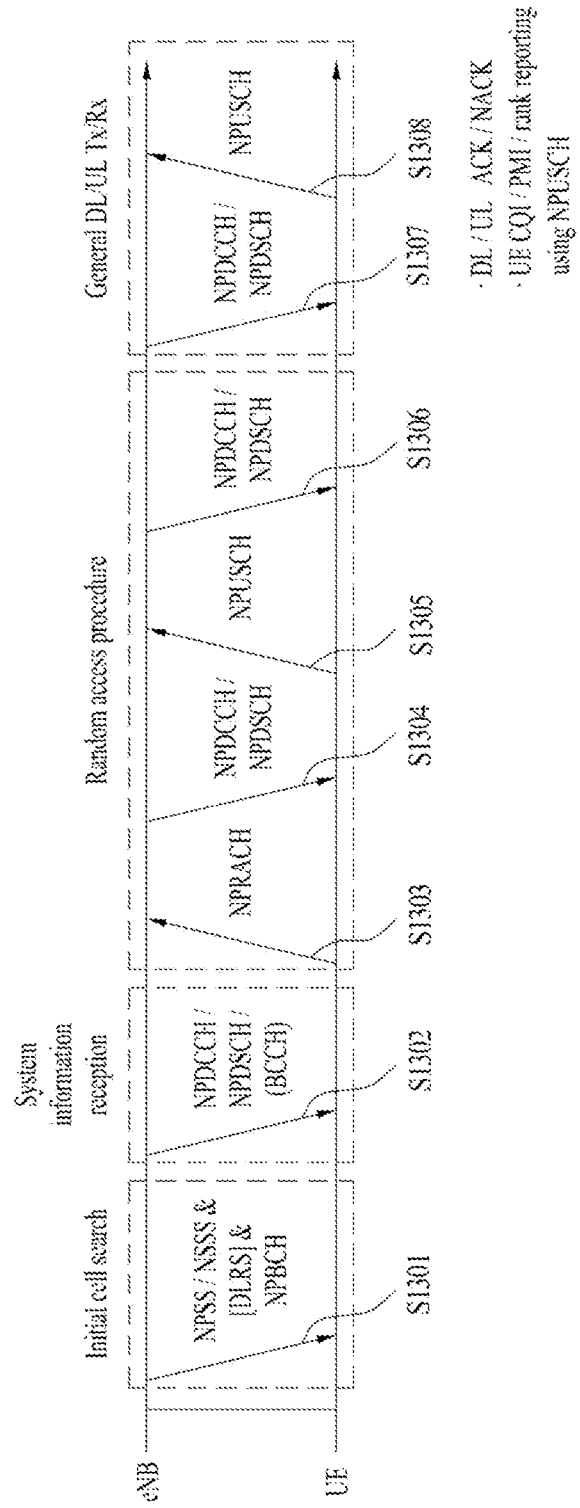
FIG. 13 is a diagram illustrating physical channels and a general signal transmission using the physical channels in narrowband Internet of things (NB-IoT)

FIG. 13 illustrates physical channels and a general signal transmission using the physical channels in NB-IoT. In a wireless communication system, a UE receives information on a DL from a BS and transmits information on a UL to the BS. Information transmitted and received between the BS and the UE includes data and various types of control information, and various physical channels are defined according to the types/usages of information carried on the physical channels.

When a UE is powered on or enters a new cell, the UE performs initial cell search including acquisition of synchronization with a BS (S1301). For the initial cell search, the UE synchronizes its timing with the BS and acquires information such as a cell ID by receiving a narrowband primary synchronization signal (NPSS) and a narrowband secondary synchronization signal (NSSS) from the BS. The UE may then acquire information broadcast in the cell by receiving a narrowband physical broadcast channel (NPBCH) signal from the BS (S1302). During the initial cell search, the UE may further monitor a DL channel state by receiving a DL RS.

After the initial cell search, the UE may acquire more detailed system information by receiving a narrowband PDCCH (NPDCCH) and receiving a narrowband PDSCH (NPDSCH) corresponding to the NPDCCH (S1302).

Subsequently, to complete the connection to the BS, the UE may perform a random access procedure with the BS (S1303 to S1306). Specifically, the UE may transmit a random access preamble on a narrowband physical random access channel (NPRACH) (S1303) and may receive an NPDCCH and an RAR to the preamble on an NPDSCH corresponding to the NPDCCH (S1304). The UE may then transmit a narrowband physical uplink shared channel (NPUSCH) by using scheduling information included in the RAR (S1305), and perform a contention resolution procedure including reception of an NPDCCH and an NPDSCH corresponding to the PDCCH (S1306).

After the above procedure, the UE may receive an NPDCCH signal and/or an NPDSCH signal from the BS (S1307) and transmit an NPUSCH signal to the BS (S1308) in a general UL/DL signal transmission procedure. Control information that the UE transmits to the BS is generically called UCI. The UCI includes an HARQ ACK/NACK, an SR, and CSI. The CSI includes a CQI, a PMI, an RI, and so on. In NB-IoT, the UCI is transmitted on an NPUSCH. The UE may transmit the UCI on the NPUSCH periodically, aperiodically, or semi-persistently according to a request/command of the network (e.g., BS).

A different NB-IoT frame structure may be configured according to an SCS. For example, the NB-IoT system may support a 15 kHz SCS and a 3.75 kHz SCS. NB-IoT may be considered for any other SCS (e.g., 30 kHz) with different time/frequency units, not limited to the 15 kHz SCS and the 3.75 kHz SCS. While the NB-IoT frame structure based on the LTE system frame structure has been described herein for the convenience of description, the present disclosure is not limited thereto, and methods described in the present disclosure may be extended to NB-IoT based on a frame structure of the next-generation system (e.g., NR system).

Figure 14:
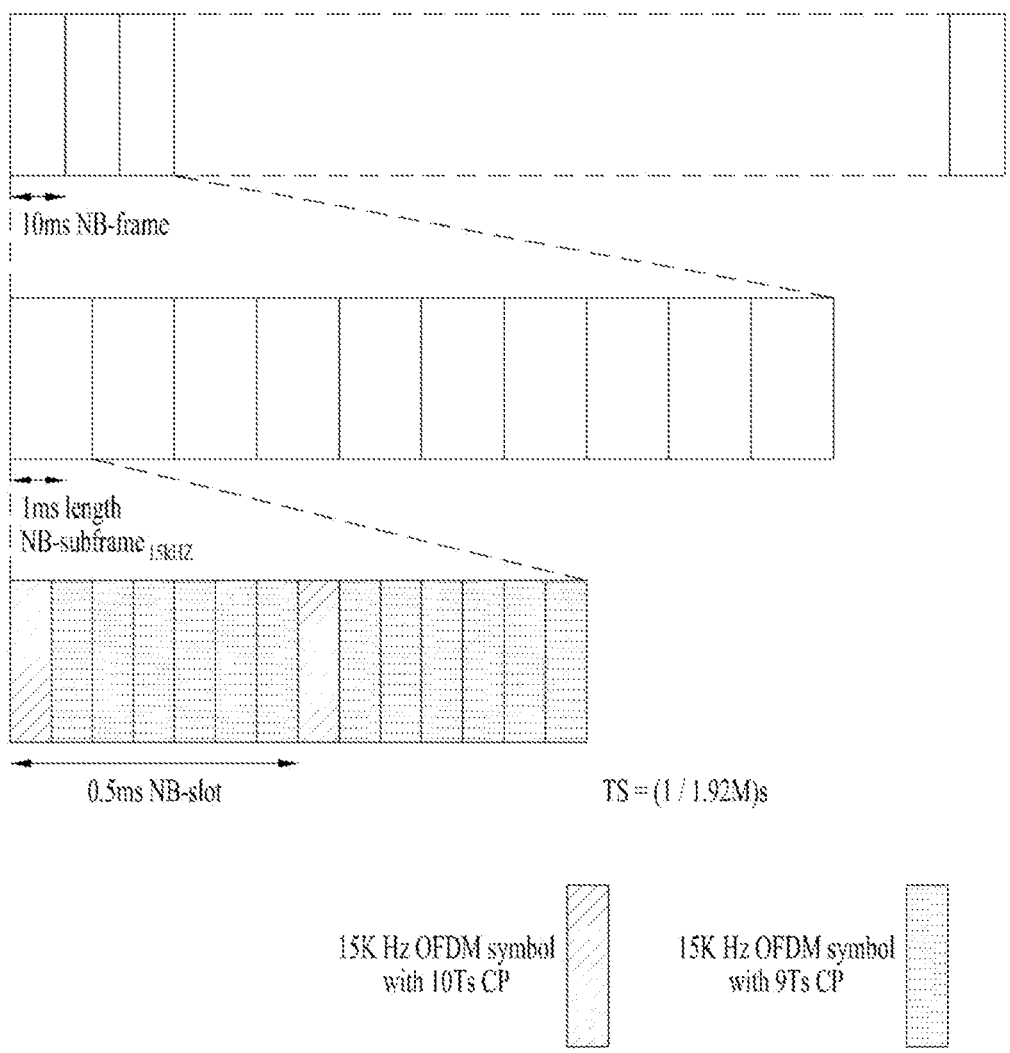
FIG. 14 is a diagram illustrating a frame structure with a subcarrier spacing (SCS) of 15 kHz.
Figure 15:
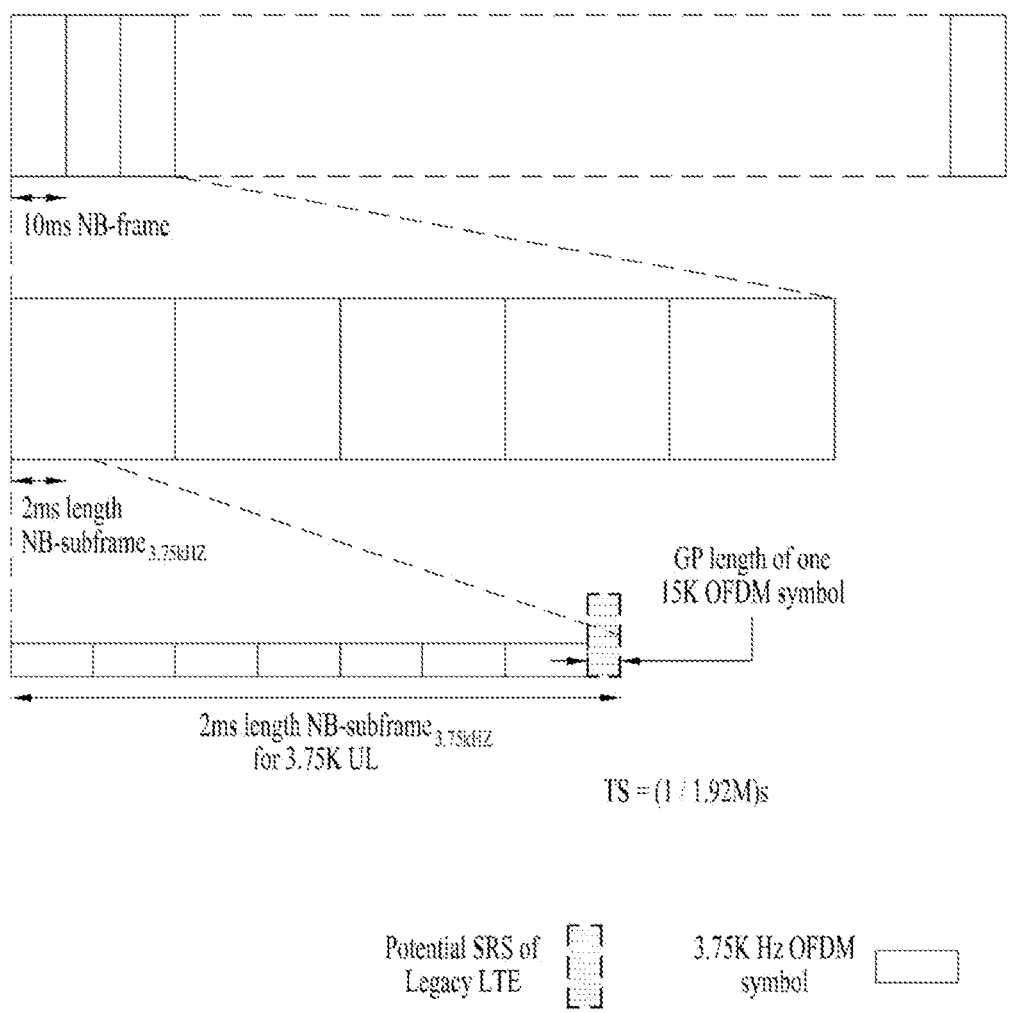
FIG. 15 is a diagram illustrating a frame structure with an SCS of 3.75 kHz.

FIG. 14 is a diagram illustrating a frame structure with an SCS of 15 kHz, and FIG. 15 is a diagram illustrating a frame structure with an SCS of 3.75 kHz.

Referring to FIG. 14, an NB-IoT frame structure for the 15 kHz SCS may be configured to be identical to the frame structure of the above-described legacy system (i.e., LTE system). That is, a 10-ms NB-IoT frame may include 10 1-ms NB-IoT subframes, each including two 0.5-ms NB-IoT slots. Each 0.5-ms NB-IoT slot may include 7 OFDM symbols.

Referring to FIG. 15, for the 3.75 kHz SCS, a 10-ms NB-IoT frame includes 5 2-ms NB-IoT subframes, each including 7 OFDM symbols and one guard period (GP). A 2-ms NB-IoT subframe may also be referred to as an NB-IoT slot or an NB-IoT resource unit (RU).

NB-IoT DL physical resources may be configured based on the configuration of physical resources in another wireless communication system (e.g., LTE or NR), except that an NR system bandwidth is a certain number of RBs (e.g., one RB, i.e., 180 kHz). For example, when the NB-IoT DL supports only the 15 kHz SCS, the NB-IoT DL physical resources may be configured as the resource area of one RB (i.e., one PRB) in the frequency domain, to which the resource grid of the LTE system illustrated in FIG. 4 is limited, as described above. Likewise, for NB-IoT UL physical resources, the system bandwidth may be limited to one RB.

Figure 16:
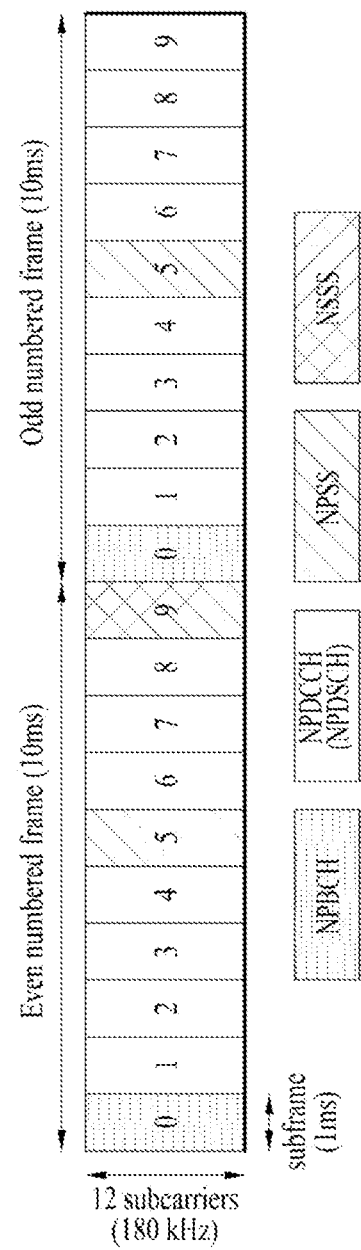
FIG. 16 is a diagram illustrating transmission of NB-IoT DL physical channels/signals.

FIG. 16 illustrates transmission of NB-IoT DL physical channels/signals. An NB-IoT DL physical channel/signal is transmitted in one PRB and supports the 15 kHz SCS/multi-tone transmission.

Referring to FIG. 16, the NPSS is transmitted in the sixth subframe of every frame, and the NSSS is transmitted in the last (e.g., tenth) subframe of every even-numbered frame. A UE may acquire frequency, symbol, and frame synchronization using the synchronization signals (NPSS and NSSS) and search 504 physical cell IDs (PCIDs) (i.e., BS IDs). The NPBCH is transmitted in the first subframe of every frame, carrying an NB-MIB. The NRS is provided as an RS for DL physical channel demodulation and generated in the same manner as in LTE. However, an NB-PCID (NCell ID or NB-IoT BS ID) is used as an initialization value for generation of an NRS sequence. The NRS is transmitted through one or two antenna ports. The NPDCCH and the NPDSCH may be transmitted in the remaining subframes except for the subframes carrying the NPSS, the NSSS, and the NPBCH. The NPDCCH and the NPDSCH may not be transmitted in the same subframe. The NPDCCH carries DCI, and the DCI supports three types of DCI formats. DCI format N0 includes NPUSCH scheduling information, and DCI formats N1 and N2 include NPDSCH scheduling information. The NPDCCH may be transmitted up to 2048 times, for CE. The NPDSCH is used to transmit data (e.g., TB) of a transport channel such as a DL-SCH and a paging channel (PCH). A maximum TB size (TBS) is 680 bits, and a TB may be repeatedly transmitted up to 2048 times, for CE.

NB-IoT UL physical channels include narrowband PRACH (NPRACH) and NPUSCH, and support single-tone transmission and multi-tone transmission. Single-tone transmission is supported for the SCSs of 3.5 kHz and 15 kHz, and multi-tone transmission is supported only for the 15 kHz SCS.

SC-FDMA may be applied to NB-IoT UL based on the SCS of 15 kHz or 3.75 kHz. Multi-tone transmission and single-tone transmission may be supported for the NB-IoT UL. For example, multi-tone transmission is supported only for the 15 kHz SCS, and single-tone transmission may be supported for the SCSs of 15 kHz and 3.75 kHz.

As mentioned in relation to the NB-IoT DL, the physical channels of the NB-IoT system may have names added with "N (Narrowband)" to distinguish them from the channels of the existing systems. For example, the NB-IoT UL physical channels may include NPRACH, NPUSCH, and so on, and the NB-IoT UL physical signals may include narrowband DMRS (NDMRS).

The NPUSCH may be configured in NPUSCH format 1 or NPUSCH format 2. For example, NPUSCH format 1 may be used to carry (or deliver) a UL-SCH, and NPUSCH format 2 may be used to transmit UCI such as an HARQ ACK.

Characteristically, the UL channel of the NB-IoT system, NPRACH may be repeatedly transmitted, for CE. In this case, frequency hopping may be applied to the repeated transmissions.

E. Symbols, Abbreviations, and Terms

Symbols/abbreviations/terms used in the present disclosure are defined as follows.

PDCCH: Physical Downlink Control Channel. The PDCCH is a physical-layer communication channel that provides DCI. Methods proposed in the present disclosure are applicable to PDCCHs having various structures such as enhanced-PDCCH (EPDCCH), MTC-PDCCH (MPDCCH), and narrowband-PDCCH (NPDCCH), even though not explicitly indicated. Hereinbelow, the PDCCH represents these PDCCHs of various structures.

PUCCH: Physical Uplink Control Channel. The PUCCH is a physical-layer communication channel that provides UCI. The methods proposed in the present disclosure are applicable to PUCCHs having various structures. Hereinbelow, the PUCCH represents the PUCCHs of various structures.

PDSCH: Physical Downlink Shared Channel. The PDSCH is a physical-layer communication channel that provides DL data. The methods proposed in the present disclosure are applicable to PDSCHs having various structures such as NPDSCH, even though not explicitly indicated. Hereinbelow, the PDSCH represents the PDSCHs of various structures.

PUSCH: Physical Uplink Shared Channel. The PUSCH is a physical-layer communication channel that provides UL data. The methods proposed in the present disclosure are applicable to PUSCHs having various structures such as NPUSCH, even though not explicitly indicated. Hereinbelow, the PUSCH represents the PUSCHs of various structures.

DCI: Downlink Control Information

UCI: Uplink Control Information

NDI: New Data Indicator. The NDI may be included in DCI (transmitted/received on a PDCCH), indicating whether a PDSCH/PUSCH scheduled by the DCI carries new data or retransmission data.

CB: Code Block

CBG: Code Block Group

TB: Transport Block

TBS: Transport Block Size

SF: Subframe

RE: Resource Element

RB: Resource Block

HARQ: Hybrid Automatic Repeat reQuest

SIB: System Information Block

RRC: Radio Resource Control

LAA: Licensed Assisted Access. A band specified for the LTE/LTE-A/LTE-A Pro/5G/NR system is referred to as a licensed band, a band unspecified for the LTE/LTE-A/LTE-A Pro/5G/NR system is referred to as an unlicensed band, and an operation in an unlicensed band is referred to as LAA.

Scheduling delay: the interval between the ending transmission position (e.g., SF or slot) of a PDCCH dynamically scheduled by DCI and the starting transmission position (e.g., SF or slot) of a scheduled TB (e.g., PUSCH or PDSCH).

Common parameter: a parameter applied commonly to a plurality of TBs among parameters included in DCI that schedules a plurality of TBs.

F. Proposed Methods of the Present Disclosure

F.1. Problem of Background Art

In communication systems such as LTE and NR, one PDSCH or PUSCH is generally scheduled by one DCI. When a plurality of TBs or HARQ processes are to be scheduled, a UE should obtain DCIs each scheduling a TB or an HARQ process by monitoring a plurality of different search spaces. However, when successive PDSCH/PUSCH transmissions are required due to the size of transmission data greater than a TBS transmittable at one time on a PDSCH/PUSCH or the need for periodic data transmissions, repeated PDCCH transmissions may increase the network overhead of a BS, and repeated PDCCH monitoring may increase the power consumption of the UE.

To avert the problem, multi-TB (or multiple-TB) scheduling for scheduling a plurality of TBs by one DCI may be considered. Multi-TB scheduling offers the benefits of reduced network overhead which might otherwise be increased in view of repeated PDCCH transmissions at the BS and reduced power consumption for additional DCI detection at the UE. In LTE, multi-SF (or multiple-SF) scheduling was proposed to control a plurality of PUSCH transmissions by one DCI in an LAA communication structure. Multi-SF scheduling advantageously enables the BS to schedule PUSCH transmissions corresponding to up to four HARQ processes by one DCI and enables the UE to perform a plurality of PUSCH transmissions just by one PDCCH monitoring. Similarly, multi-TB scheduling is under discussion to schedule a plurality of TBs by one DCI in the current Rel-16 NB-IoT/MTC system.

In multi-SF scheduling introduced to LTE LAA, consecutive HARQ process IDs may be scheduled by one DCI. Similarly, a structure for scheduling consecutive HARQ process IDs may be introduced to Rel-16 NB-IoT/MTC. Compared to scheduling of non-consecutive HARQ process IDs, this scheme may decrease the overhead of DCI bits. Nonetheless, it may occur that non-consecutive HARQ process IDs need to be scheduled. Particularly, as the number of schedulable HARQ processes increases, more combinations of HARQ process IDs may need to be scheduled.

In another method of reducing the number of DCI bits, some of parameters included in DCI may be used as common parameters. However, the setting of common parameters may decrease the flexibility of scheduling a plurality of TBs. For example, when an MCS and a TBS are set as common parameters to reduce the number of DCI bits and some of scheduled TBs are retransmissions, different MCSs/TBSs may be required for the retransmission TBs and the initial transmission TBs, which may limit setting and use of common parameters.

To solve the problem, the present disclosure proposes methods of sequentially obtaining a plurality of DCIs by a UE, when multi-TB scheduling is used. Characteristically, the present disclosure proposes conditions and methods for monitoring an additional DCI after obtaining one DCI by a UE and related TB transmission/reception procedures in a situation in which a plurality of TBs or HARQ processes may be scheduled by one DCI.

The proposed methods of the present disclosure may be applied to multi-TB scheduling for controlling one or more TB transmissions by one DCI in MTC and NB-IoT implemented in an LTE system. MTC and NB-IoT are technologies requiring low UE complexity and wide coverage, which are characterized in that the number of DCI formats which may be blind-decoded simultaneously is significantly limited to satisfy the low complexity requirement. Moreover, the requirement of a minimum gap should be satisfied to enable a low-complexity UE to transmit/receive a scheduled TB after detecting DCI. For this purpose, a scheduling delay may be configured dynamically by DCI. Because the UE may perform blind decoding to detect an additional DCI during a time period to which the scheduling delay is applied as in the existing NB-IoT/MTC system, the problem encountered with multi-TB scheduling may be overcome by the proposed methods of the present disclosure.

Alternatively, the proposed methods of the present disclosure may be applied to multi-SF scheduling for scheduling one or more PUSCH transmissions by one DCI as in LAA implemented in the LTE system. As described before, because only consecutive HARQ process IDs are scheduled in the multi-SF scheduling scheme defined for the current LAA, scheduling of non-consecutive HARQ process IDs may be limited. This limitation may be eliminated by applying the proposed methods of the present disclosure.

Further, the same approach may be adopted for an unlicensed band (U-band) technology under discussion in the NR system because of similarity to LTE LAA. Specifically, multi-TTI (multiple-TTI) scheduling for scheduling TBs in one or more slots by one DCI is being discussed in the U-band technology, and scheduling of consecutive HARQ process IDs may be introduced as in LAA, to realize a low-overhead DCI design. Multi-slot (or multiple-slot) scheduling for scheduling one or more PDSCHs/PUSCHs by one DCI is also available as one of candidate technologies discussed to reduce power consumption of a UE in the NR system. Likewise, the proposed methods of the present disclosure may be applied to schedule non-consecutive TBs or HARQ process IDs.

Besides the above-described exemplary technologies to which the proposed methods are applicable, the present disclosure proposed to design a control channel carrying DCI or UCI may be applied to a general communication system, as far as the principle of the present disclosure is maintained.

F.2. Proposed Methods of the Present Disclosure

As an example to which the proposed methods of the present disclosure are applied, multi-TB scheduling for dynamically scheduling one or more TBs by one DCI may be considered in communication systems such as LTE and NR. The term TB refers to a unit in which one transmission takes place, which may be replaced with scheduled transmission units (e.g., CB, CBG, subframe, slot, symbol, RE, RB, and HARQ process) used in technologies to which the present disclosure is applied.

Figure 17:
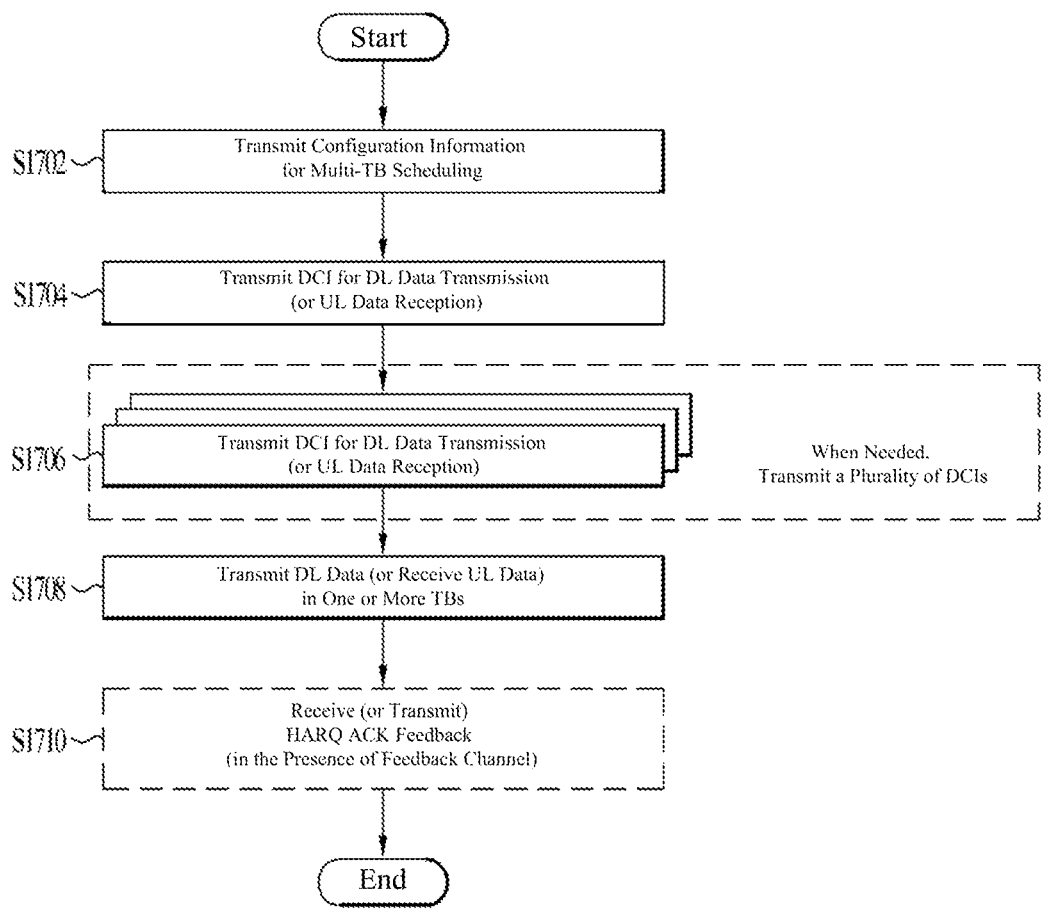
FIGS. 17 and 18 are flowcharts illustrating operations to which proposed methods of the present disclosure are applicable.
Figure 18:
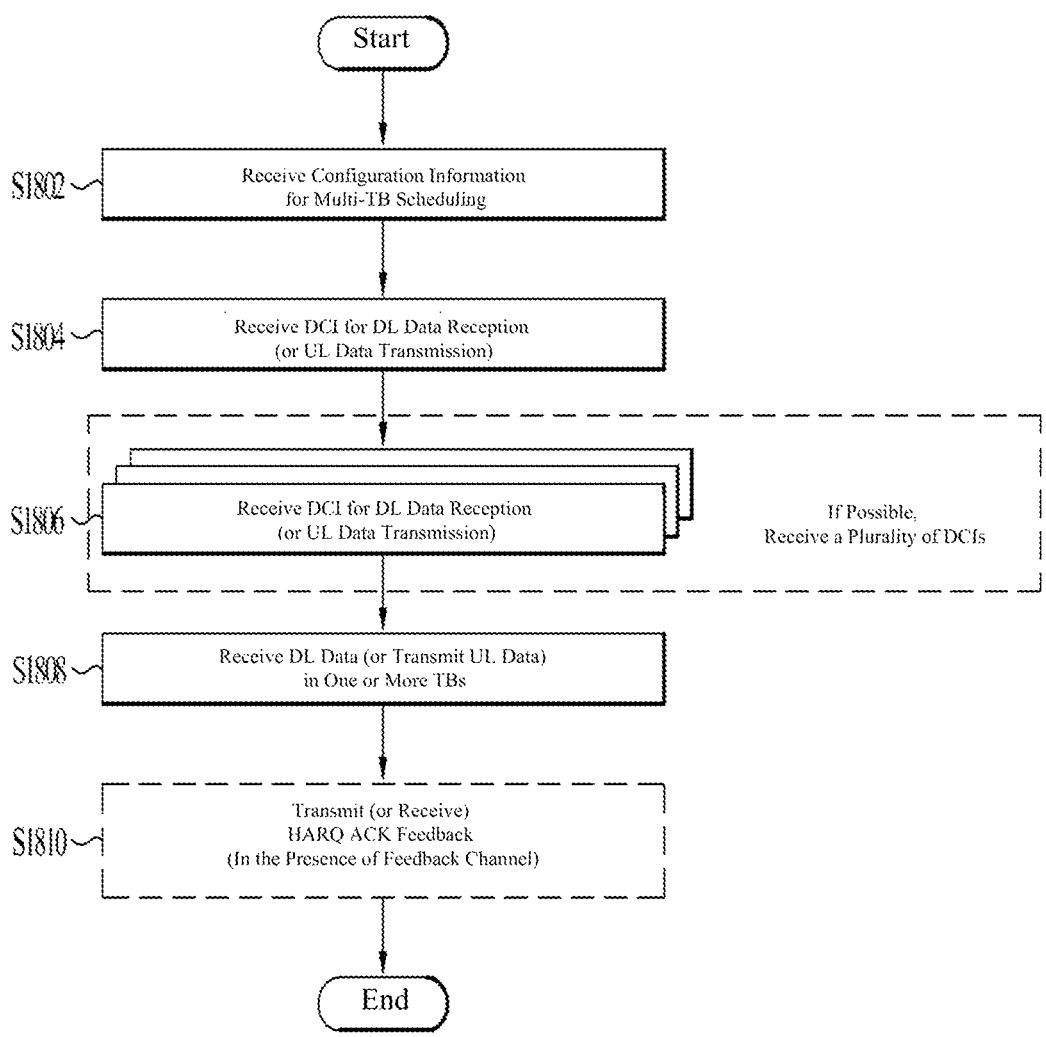

FIGS. 17 and 18 are flowcharts illustrating operations to which the proposed methods of the present disclosure are applied. FIGS. 17 and 18 are merely examples, and thus the proposed methods of the present disclosure may be applied without being limited to the examples of FIGS. 17 and 18. For example, the proposed methods of the present disclosure may be implemented without some of the operations illustrated in FIGS. 17 and 18 or with some operations added to the operations illustrated in FIGS. 17 and 18.

Referring to FIG. 17, a BS may transmit configuration information for multi-TB scheduling to a UE (S1702). For example, the BS may signal information indicating support of multi-TB scheduling and related parameters to the UE. For example, the information may be signaled by higher-layer signaling such as an SIB or RRC signaling or may be dynamically configured by DCI. Subsequently, in the presence of data to be transmitted to or received from the UE, the BS may transmit, to the UE, DCI that schedules a TB transmission/reception (S1704). When the BS needs to transmit a plurality of DCIs, the BS may transmit an additional DCI during a (time) period until before the TB transmission starts after the transmission of the first DCI (S1706). In the presence of transmission data, the BS may perform one or more TB transmissions after the DCI transmission is completed (S1708). When the BS needs an HARQ-ACK feedback channel, the BS may perform an operation of receiving the HARQ-ACK feedback channel (S1710). In the presence of data to be received, the BS may perform one or more TB receptions after the DCI transmission is completed (S1708). When the BS requires an HARQ-ACK feedback channel, the BS may perform an operation of transmitting the HARQ-ACK feedback channel (S1710). FIG. 17 illustrates an exemplary BS operation.

Referring to FIG. 18, the UE may receive configuration information for multi-TB scheduling from the BS (S1802). For example, upon receipt of signaling including information indicating support of multi-TB scheduling and related parameters, the UE may monitor DCI for multi-TB scheduling (S1804). Subsequently, upon detection/receipt of DCI including multi-TB scheduling information, the UE determines the transmission/reception position of a TB based on the signaling and the multi-TB scheduling information included in the DCI. When the UE may monitor an additional DCI before the transmission/reception of the TB starts, the UE attempts to detect the additional DCI (S1806). In the presence of data to be received, the UE performs one or more TB receptions after the DCI reception is completed (S1808). When the UE requires an HARQ-ACK feedback channel, the UE performs an operation of transmitting the HARQ-ACK feedback channel (S1810). In the presence of transmission data, the UE performs one or more TB transmissions after the DCI reception is completed (S1808). When the UE requires an HARQ-ACK feedback channel, the UE performs an operation of receiving the HARQ-ACK feedback channel (S1810). FIG. 18 illustrates an exemplary UE operation.

Figure 19:
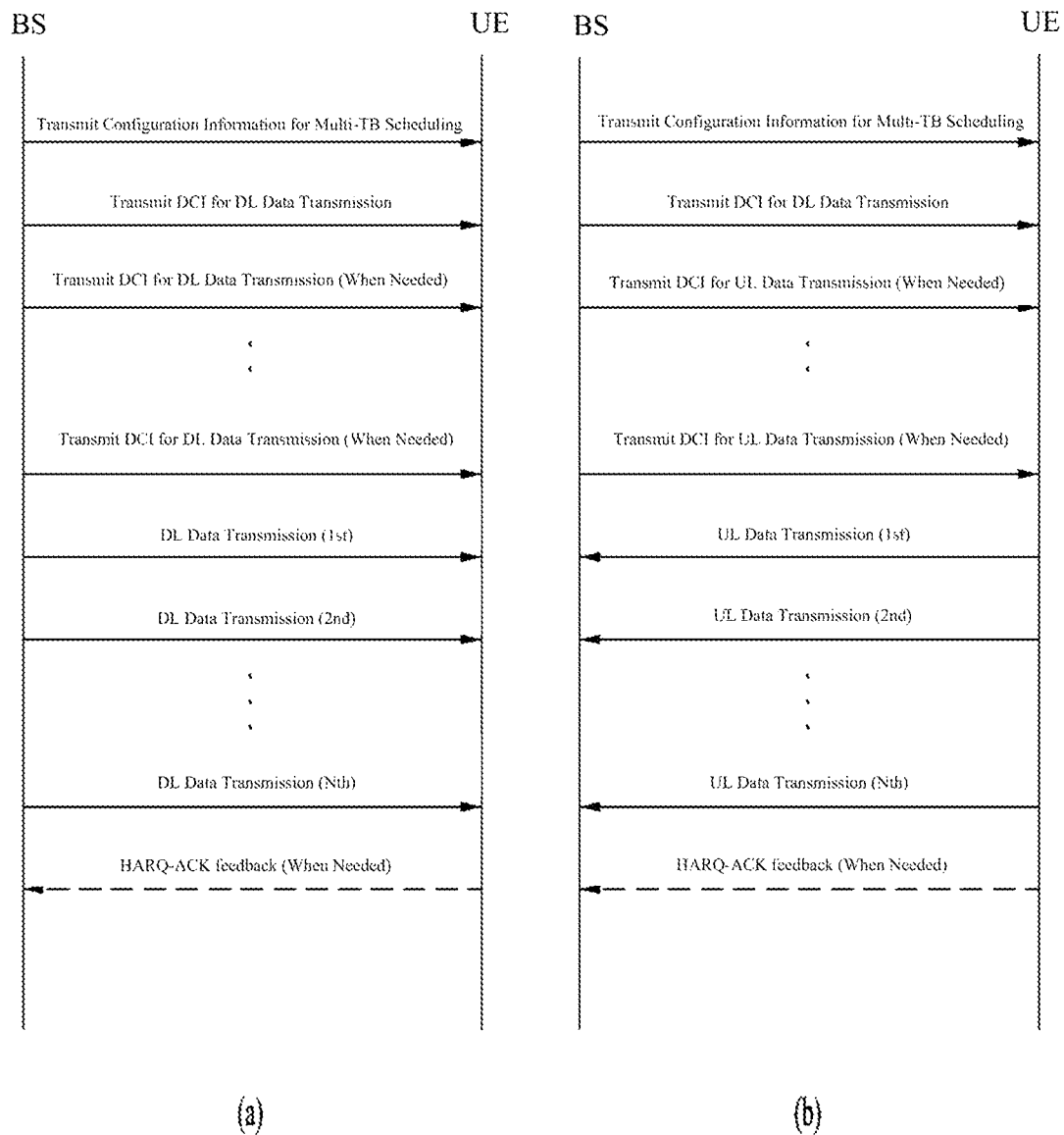
FIG. 19 is a diagram illustrating a transmission/reception process between a base station (BS) and a user equipment (UE)

FIG. 19 is a diagram illustrating a transmission/reception process between the BS and the UE. FIG. 19(a) illustrates an exemplary DL data transmission/reception process according to a proposed method of the present disclosure, and FIG. 19(b) illustrates an exemplary UL data transmission/reception process according to a proposed method of the present disclosure.

In the examples of FIGS. 17, 18 and 19, when the system supports MTC, DCI may be transmitted/received on an MPDCCH, UL data may be transmitted/received at least once on a PUSCH, DL data may be transmitted/received at least once on a PDSCH, and an HARQ-ACK feedback may be transmitted/received at least once on a PUSCH (refer to "C. MTC (Machine Type Communication)"). When the system supports NB-IoT in the examples of FIGS. 17, 18, and 19, DCI may be transmitted/received on an NPDCCH, UL data may be transmitted/received at least once on an NPUSCH, DL data may be transmitted/received at least once on an NPDSCH, and an HARQ-ACK feedback may be transmitted/received at least once on the NPUSCH (refer to "D. NB-IoT (Narrowband-Internet of Things)"). NPDCCH and MPDCCH may be collectively referred to as PDCCH, NPUSCH may be referred to as PUSCH, and NPDSCH may be referred to as PDSCH.

While the operations of the BS and the UE have been described above in the context of multi-TB scheduling based on one DCI, the principle of the present disclosure may also be applied to other information transmission schemes such as UCI-based UL control channel transmission.

The proposed methods of the present disclosure may be applied by selecting some of the following methods. Each of the methods may be performed alone or in combination with one or more other methods. Some terms, symbols, and orders used to describe the present disclosure may be replaced with other terms, symbols, and orders, as far as the principle of the present disclosure is maintained.

Method 1

The present disclosure proposes methods of, upon detection of DCI for multi-TB scheduling, determining whether to attempt to detect an additional DCI according to a specific condition by a UE. In case the UE fails in detecting some DCI, it may be regulated that a first DCI and a subsequent additional DCI are transmitted/received with the same DCI format in the same type of search spaces, not to increase the number of blind decodings at the UE.

For the specific condition for determining whether to attempt to detect an additional DCI, one or more of the following Option 1-1, Option 1-2, Option 1-3, Option 1-4, Option 1-5, Option 1-6, and Option 1-7 may be used in combination in Method 1.

(Option 1-1) When the number of TBs scheduled for transmission/reception by detected DCI(s) is less than a specific number X, the UE continues to monitor an additional DCI. When the number of TBs scheduled for transmission/reception by the detected DCI(s) is equal to or greater than the specific number X, the UE discontinues the monitoring of the additional DCI. The BS may be configured to schedule a plurality of TBs by a plurality of DCIs available for multi-TB scheduling and, when the number of already scheduled TBs for transmission/reception is equal to or greater than X, not to transmit an additional DCI.

In an example of Option 1-1, after the BS transmits a first DCI to the UE (e.g., see S1704), the BS may additionally transmit second DCI to the UE during a time period between the end of the first DCI transmission and the start of transmission or reception of a TB scheduled by the first DCI, based on the number of TBs scheduled by the first DCI being less than a specific number X (e.g., see S1706). On the contrary, based on the number of TBs scheduled by the first DCI being equal to or greater than the specific number X, the BS may discontinue or skip the transmission of an additional DCI during the time period between the end of the first DCI transmission and the start of the transmission or reception of the TB scheduled by the first DCI. When needed, the BS may additionally transmit a third DCI to the UE during a time period between the end of the second DCI transmission and the start of the transmission or reception of the TB scheduled by the first DCI (e.g., see S1706). On the contrary, based on the number of TBs scheduled by the first DCI and the second DCI being equal to or greater than the specific number X, the BS may discontinue or skip the transmission of an additional DCI during the time period between the end of the second DCI transmission and the start of the transmission or reception of the TB scheduled by the first DCI (e.g., see S1706). The number of additional DCIs to be transmitted by the BS during the time period between the end of the first DCI transmission and the start of the transmission or reception of the TB scheduled by the first DCI may be determined according to the specific number X.

In an example of Option 1-1, after the UE receives a first DCI from the BS (e.g., see S1804), the UE may monitor second DCI during a time period between the end of the first DCI reception and the start of transmission or reception of a TB scheduled by the first DCI, based on the number of TBs scheduled by the first DCI being less than a specific number X (e.g., see S1806). On the contrary, based on the number of TBs scheduled by the first DCI being equal to or greater than the specific number X, the UE may discontinue or skip the monitoring of an additional DCI during the time period between the end of the first DCI reception and the start of the transmission or reception of the TB scheduled by the first DCI. When needed (e.g., when the number of scheduled TBs is less than the specific number X), the UE may monitor a third DCI during the time period between the end of the second DCI reception and the start of the transmission or reception of the TB scheduled by the first DCI (e.g., see S1806). On the contrary, based on the number of TBs scheduled by the first DCI and the second DCI being equal to or greater than the specific number X, the UE may discontinue or skip the monitoring of an additional DCI during the time period between the end of the second DCI reception and the start of the transmission or reception of the TB scheduled by the first DCI. The number of additional DCIs to be monitored by the UE during the time period between the end of the first DCI reception and the start of the transmission or reception of the TB scheduled by the first DCI may be determined according to the specific number X.

In an example of Option 1-1, the specific number X may be a maximum number of TBs (e.g., a maximum number of HARQ processes) that the UE is capable of processing at the same time. This may be intended to prevent a problem involved in (HARQ) process ID management as well as to consider the soft buffer limitation of the UE. Specifically, when Option 1-1 is applied to unicast transmission in MTC or NB-IoT, the specific number X may be a maximum number of configurable HARQ processes in multi-TB scheduling. For example, X=8 in CE mode A of MTC (e.g., see Table 6 and its related description), X=4 in CE mode B of MTC (e.g., see Table 6 and its related description), and X=2 in NB-IoT.

In an example of Option 1-1, the specific number X may be any number less than the maximum number of TBs that the UE is capable of processing at the same time. This may reduce the number of attempts to detect an additional DCI and hence reduce the power consumption of DCI monitoring. The value of X may be preset in a standard or indicated by a higher-layer signal such as an SIB or an RRC signal. Specifically, when Option 1-2 is applied to unicast transmission in MTC or NB-IoT, the specific number X may be applied based on the number of scheduled HARQ processes in multi-TB scheduling.

(Option 1-2) When a detected DCI schedules only one TB, the UE monitors an additional DCI. When the following DCI also schedules only one TB, the UE may continue to monitor an additional DCI. When the additional DCI schedules a plurality of TBs, the UE discontinues or skips an attempt to detect an additional DCI. When the BS is to schedule a plurality of TBs by a plurality of DCIs available for multi-TB scheduling, the UE may transmit only DCIs each scheduling a single TB or DCI scheduling a plurality of TBs in the last place.

In an example of Option 1-2, after the BS transmits a first DCI to the UE (e.g., see S1704), the BS may additionally transmit second DCI to the UE during a time period between the end of the first DCI transmission and the start of transmission or reception of a TB scheduled by the first DCI, based on the number of TBs scheduled by the first DCI being 1 (e.g., see S1706). On the contrary, based on the number of TBs scheduled by the first DCI being 2 or larger, the BS may discontinue or skip the transmission of an additional DCI during the time period between the end of the first DCI transmission and the start of the transmission or reception of the TB scheduled by the first DCI. When needed, the BS may additionally transmit a third DCI to the UE during a time period between the end of the second DCI transmission and the start of the transmission or reception of the TB scheduled by the first DCI (e.g., see S1706). On the contrary, based on the number of TBs scheduled by the second DCI being 1, the BS may discontinue or skip the transmission of an additional DCI during the time period between the end of the second DCI transmission and the start of the transmission or reception of the TB scheduled by the first DCI.

In an example of Option 1-2, after the UE receives a first DCI from the BS (e.g., see S1804), the UE may monitor second DCI during a time period between the end of the first DCI reception and the start of transmission or reception of a TB scheduled by the first DCI, based on the number of TBs scheduled by the first DCI being 1 (e.g., see S1806). On the contrary, based on the number of TBs scheduled by the first DCI being 2 or larger, the UE may discontinue or skip the monitoring of an additional DCI during the time period between the end of the first DCI reception and the start of the transmission or reception of the TB scheduled by the first DCI. When needed (e.g., when the number of TBs scheduled by the second DCI being 1), the UE may monitor a third DCI during a time period between the end of the second DCI reception and the start of the transmission or reception of the TB scheduled by the first DCI (e.g., see S1806). On the contrary, based on the number of TBs scheduled by the second DCI being 2 or larger, the UE may discontinue or skip the monitoring of an additional DCI during the time period between the end of the second DCI reception and the start of the transmission or reception of the TB scheduled by the first DCI.

Option 1-2 may advantageously prevent the power consumption of the UE caused by unnecessary DCI monitoring because the BS may control a time when the UE is to discontinue monitoring of an additional DCI. Specifically, in the case where Option 1-2 is applied to unicast transmission in MTC or NB-IoT, when DCI detected by the UE delivers scheduling information for only one HARQ process, the UE may be configured to monitor an additional DCI (during a time period between the end of the DCI detection and the start of transmission or reception of a TB scheduled by the DCI). When the DCI includes information about a plurality of HARQ processes, the UE may be configured to discontinue or skip the monitoring of an additional DCI (during the time period between the end of the DCI detection and the start of the transmission or reception of the TB scheduled by the DCI).

(Option 1-3) The UE is configured to monitor an additional DCI up to Z times after obtaining DCI. The UE may attempt to detect an additional DCI in Z search spaces after obtaining the first DCI, and then discontinue or skip the monitoring of an additional DCI. When the BS is to transmit a plurality of DCIs, the BS may transmit up to Z+1 DCIs in up to Z+1 consecutive search spaces.

Option 1-3 may limit the maximum number of blind decoding attempts for DCI detection at the UE, thereby restricting the maximum power consumption of the UE.

In Option 1-3, for example, the value of Z may be fixed in a standard or determined by a higher-layer signal such as an SIB or an RRC signal (e.g., see S1702 or S1802).

(Option 1-4) The UE continues to monitor an additional DCI until before a predetermined time period Y ms before the start of transmission of a TB scheduled by DCI(s). Alternatively, the UE discontinues or skips the monitoring of an additional DCI until before the predetermined time period Y ms before the start of the transmission of the TB scheduled by the DCI(s). The UE may attempt to detect an additional DCI until before the predetermined time period Y ms before the starting position of the transmission/reception of the TB scheduled by the DCI(s). Alternatively, the UE may discontinue or skip the detection of an additional DCI during the predetermined time period Y ms before the starting position of the transmission/reception of the TB scheduled by the DCI(s). The BS may transmit one or more DCIs during a (time) period until before the predetermined time period Y ms before the starting position of transmission/reception of a scheduled TB. Alternatively, the BS may discontinue or skip the DCI transmission during the predetermined time period Y ms before the starting position of the transmission/reception of the scheduled TB.

Option 1-4 may be applied based on the number of time resources (e.g., subframes, slots, TTIs, or symbols) according to a frame structure configured for the UE. For example, the number of time resources (e.g., subframes, slots, TTIs, or symbols) may be determined in correspondence with the duration of the predetermined time period, Y ms and determined as a function of Y. In a more specific example, when an LTE frame structure is used, Y ms may correspond to Y subframes. When an NR frame structure is used, Y ms may correspond to Y subframes or Y to 16*Y slots according to an SCS (e.g., see Table 1). The UE may discontinue or skip monitoring of an additional DCI in a specific number of time resources (e.g., corresponding to Y ms) (or during a time period corresponding to the time resources), and the BS may discontinue or skip transmission of an additional DCI in the time resources (or during the time period corresponding to the time resources). On the contrary, the UE may monitor an additional DCI before the specific number of time resources (e.g., corresponding to Y ms) (or during the time period corresponding to the time resources) before the start of the transmission of the scheduled TB, and the BS may transmit the additional DCI before the time resources (or during the time period corresponding to the time resources).

Option 1-4 may be intended to ensure a time for completing DCI detection and preparing a TB transmission/reception at the UE. Particularly when the same channel coding is used for physical channels carrying DCI and a TB as in NB-IoT, a minimum time for completing DCI decoding should be ensured. Herein, different Y values may be used for UL and DL.

(Option 1-5) Whether to monitor an additional DCI after obtaining DCI at the UE may be indicated by a higher-layer signal such as an SIB or an RRC signal. When the BS always determines not to transmit an additional DCI after transmitting one DCI to prevent transmission of a plurality of DCIs from increasing overhead, this option may be intended to allow the UE not to perform unnecessary blind decoding based on this information and thus to save power.

(Option 1-6) When scheduling information obtained from DCI is for a UL TB transmission, the UE may continue to monitor an additional DCI (during a time period between the end of the DCI acquisition and the start of the TB transmission). When a DL TB reception is scheduled for the UE, the UE may operate according to the method of determining whether to monitor an additional DCI in any other option. Even in the case where a DL TB reception is scheduled for the UE, when the UE is scheduled to transmit one or more UL TB s, the UE may be configured to continue to monitor an additional DCI. The BS may transmit an additional DCI to the UE for which the BS has scheduled a UL TB transmission.

The method of Option 1-6 may be intended to allow the UE to receive early termination information, so that the UE may discontinue repeated TB transmissions scheduled on a PUSCH before completion of the TB transmissions. For example, in MTC, when the UE is scheduled to repeatedly transmit a PUSCH, the UE may periodically monitor DCI to check information about PUSCH early termination.

(Option 1-7) A condition for determining whether to monitor an additional DCI by a UE may be updated every predetermined interval. Even when the UE determines not to monitor an additional DCI during a specific time period, the UE may be configured to resume the monitoring of an additional DCI based on a specific period. Herein, the BS may transmit the additional DCI based on the specific period.

In Option 1-7, the start of the specific period may be determined as an absolute time. For example, a time-domain absolute index such as a system frame number (SFN), a hyper-SFN (H-SFN), or an absolute subframe number may be used as a reference based on which the specific period is calculated in the LTE system. In a specific example, monitoring of an additional DCI may be allowed every T ms from subframe #B in SFN #A. Because the absolute time is used as a reference, an additional DCI may be transmitted/received without misunderstanding between the BS and the UE.

The start of the specific period may be determined to be a time when the UE discontinues monitoring of an additional DCI in Option 1-7. This may always prevent the power consumption of the UE caused by DCI detection during a predetermined time period, when the UE discontinues monitoring of an additional DCI.

Figure 20:
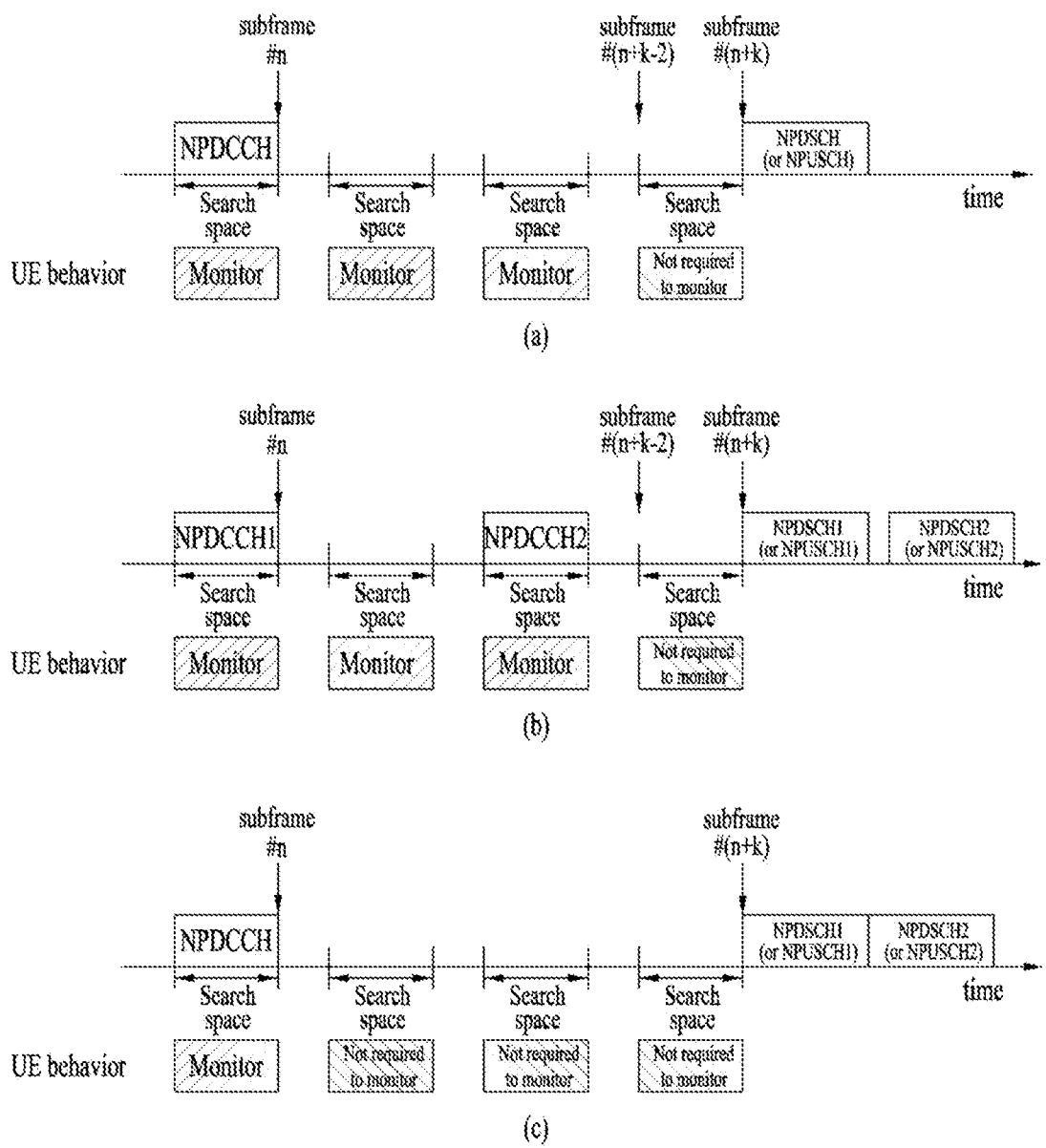
FIG. 20 is a diagram illustrating embodiments of a proposed method of the present disclosure.

FIG. 20 illustrates an embodiment of the proposed methods of the present disclosure. While the example of FIG. 20 is described in the context of NB-IoT, FIG. 20 may also be applied to the LTE system (e.g., MTC or LAA) and the NR system (e.g., U-band) without limitations (e.g., see "F.1. Problem of Background Art"). When the example of FIG. 20 is applied to the LTE system, NPDCCH may be replaced with NPDCCH or PDCCH, and NPUSCH and NPDSCH may be replaced with PUSCH and PDSCH. When the example of FIG. 20 is applied to the NR system of the LTE system, NPDCCH, NPUSCH, and NPDSCH may be replaced with PDCCH, PUSCH, and PDSCH, respectively.

Further, the example of FIG. 20 is based on the assumption that reception of a first DCI on an NPDCCH ends in subframe #n, and reception of a TB scheduled by the first DCI on an NPDSCH or transmission of the TB scheduled by the first DCI on an NPUSCH starts in subframe #(n+k). In this example, the value of k may be signaled by the first DCI. While it is assumed in the example of FIG. 20 that three search spaces are configured between the end of the first DCI reception (e.g., subframe #n) and the start of the transmission or reception of the TB scheduled by the first DCI (e.g., subframe #(n+k)), the present disclosure may also be applied in the same/similar manner to a case in which a different number of search spaces are configured, not limited to the specific number of search spaces. While it is assumed that scheduling of up to two TBs is supported in the example of FIG. 20 for convenience of description, the present disclosure may also be applied in the same/similar manner to a case in which the maximum number of TBs schedulable at the same time is not 2 (e.g., 4 or 8).

While FIG. 20 illustrates only a UE operation by way of example, operations corresponding to the operations illustrated in FIG. 20 may be performed by the BS.

FIG. 20(a) illustrates an exemplary case in which a first DCI transmitted/received on an NPDCCH schedules one TB and an additional NPDCCH (or second DCI) is not transmitted/received, FIG. 20(b) illustrates an exemplary case in which a first DCI transmitted/received on an NPDCCH (e.g., NPDCCH1) schedules one TB and second DCI is transmitted/received on an additional NPDCCH (e.g., NPDCCH2) during a time period between the end of reception of the first DCI and the start of transmission or reception of the TB based on the first DCI, and FIG. 20(c) illustrates an exemplary case in which a first DCI transmitted/received on an NPDCCH schedules two TBs. According to the proposed methods of the present disclosure, the UE may monitor an additional DCI (e.g., the second DCI) during the time period between the end of the first DCI reception (e.g., suframe #n) and the start of the transmission or reception of the TB scheduled by the first DCI (e.g., subframe #(n+k)) based on whether a specific condition (e.g., Option 1-1 to Option 1-7) according to the proposed methods of the present disclosure is satisfied.

For example, when Option 1-1 of the present disclosure is applied, the UE may monitor the additional DCI (e.g., the second DCI) during the time period between the end of the first DCI reception (e.g., suframe #n) and the start of the transmission or reception of the TB scheduled by the first DCI (e.g., subframe #(n+k)), based on the number of TBs scheduled by the first DCI being less than a specific number (e.g., see FIGS. 20(a) and 20(b)). The specific number X may be the maximum number of TBs (or the maximum number of HARQ processes) that the UE is capable of processing at the same time. X may be 8 in MTC CE mode A, 4 in MTC CE mode B, and 2 in NB-IoT (e.g., see Option 1-1 of the present disclosure). As described before, because the NB-IoT system is assumed in the example of FIG. 20(a), the specific number X is assumed to be 2, to which the present disclosure is not limited. On the contrary, the UE may skip the monitoring of the additional DCI (e.g., the second DCI) during the time period between the end of the first DCI reception (e.g., suframe #n) and the start of the transmission or reception of the TB scheduled by the first DCI (e.g., subframe #(n+k)) based on the number of TBs scheduled by the first DCI being equal to or greater than the specific number (e.g., see FIG. 20(c)).

When Option 1-4 of the present disclosure is applied in addition to or independently of Option 1-1, the UE may skip the monitoring of the additional DCI (e.g., the second DCI) during a predetermined time period Y ms (or in a predetermined number of time resource units corresponding to the duration of the predetermined time period) before the transmission or reception of the TB scheduled by the first DCI. In the examples of FIGS. 20(a) and 20(b), the UE may skip the monitoring of the additional DCI (e.g., the second DCI) during a predetermined time period (e.g., 2 ms or subframes #(n+k−1) and #(n+k−2)) before the transmission or reception of the TB scheduled by the first DCI (e.g., subframe #(n+k)). The UE may monitor or skip the monitoring of the additional DCI (e.g., the second DCI) before the predetermined time period according to the proposed methods of the present disclosure (e.g., Option 1-1 to Option 1-3, Option 1-5 to Option 1-7). In the example of FIG. 20, 2 ms is merely an example, not limiting the present disclosure.

After completely detecting DCI, the UE may sequentially transmit or receive TBs scheduled by the detected DCI to or from the BS. For example, referring to FIG. 20(a), when only the first DCI is detected and schedules one TB, the UE may transmit the TB (on an NPUSCH) or receive the TB (on an NPDSCH). For example, referring to FIG. 20(b), when the first DCI and the second DCI are detected and schedule a first TB and a second TB, respectively, the UE may transmit the first TB (on the NPUSCH) or receive the first TB (on the NPDSCH) and then transmit the second TB (on the NPUSCH) or receive the second TB (on the NPDSCH). For example, referring to FIG. 20(c), when only the first DCI is detected and the second DCI schedules the first TB and the second TB, the UE may transmit the first TB (on the NPUSCH) or receive the first TB (on the NPDSCH) and then transmit the second TB (on the NPUSCH) or receive the second TB (on the NPDSCH).

While the exemplary operations of FIG. 20 have been described based on Option 1-1 and/or Option 1-4 of the present disclosure, the UE may perform the operations of FIG. 20 based on other options of the present disclosure. For example, when Option 1-2 of the present disclosure is applied, the UE may monitor the additional DCI (e.g., the second DCI) during the time period between the end of the first DCI reception (e.g., subframe #n) and the start of the transmission or reception of the TB scheduled by the first DCI (e.g., subframe #(n+k)) based on the number of TBs scheduled by the first DCI being 1 (e.g., see FIGS. 20(a) and 20(b)). On the contrary, the UE may skip the monitoring of the additional DCI (e.g., the second DCI) during the time period between the end of the first DCI reception (e.g., subframe #n) and the start of the transmission or reception of the TB scheduled by the first DCI (e.g., subframe #(n+k)) based on the number of TBs scheduled by the first DCI being 2 or larger (e.g., see FIG. 20(c)). In another example, when Option 1-3 of the present disclosure is applied, on the assumption that the number of times monitoring is performed for detection of an additional DCI is Z (e.g., Z=2), the UE may monitor the additional DCI in Z search spaces after the end of the reception of the first DCI (e.g., subframe #n), and skip the monitoring of an additional DCI in the other search spaces (e.g., see FIGS. 20(a) and 20(b)).

G. Communication System and Devices to Which the Present Disclosure is Applied

Various descriptions, functions, procedures, proposals, methods, and/or operational flow charts of the present disclosure may be applied to, but not limited to, various fields requiring wireless communication/connection (e.g., 5G) between devices.

With reference to the drawings, the present disclosure will be described in greater detail. In the following drawings/description, like reference numerals may denote the same or corresponding hardware blocks, software blocks, or functional blocks, unless otherwise specified.

Figure 21:
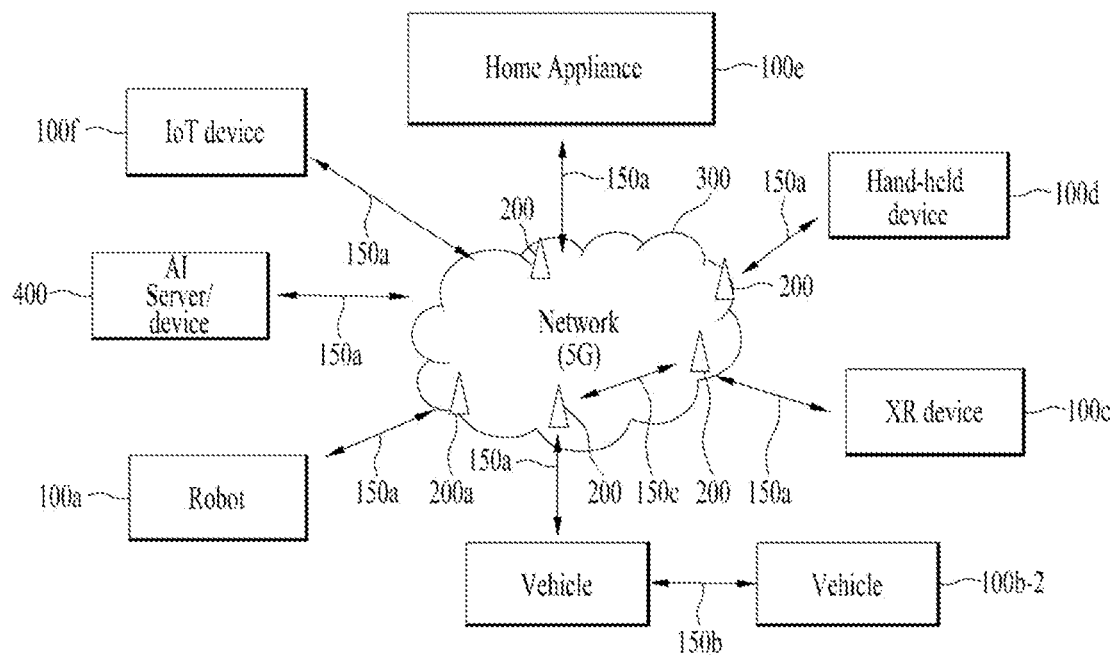
FIG. 21 is a diagram illustrating a communication system applied to the present disclosure.

FIG. 21 illustrates a communication system 1 applied to the present disclosure.

Referring to FIG. 21, the communication system 1 applied to the present disclosure includes wireless devices, BSs, and a network. The wireless devices refer to devices performing communication by radio access technology (RAT) (e.g., 5G New RAT (NR) or LTE), which may also be called communication/radio/5G devices. The wireless devices may include, but no limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle equipped with a wireless communication function, an autonomous driving vehicle, and a vehicle capable of performing vehicle-to-vehicle (V2V) communication. The vehicles may include an unmanned aerial vehicle (UAV) (e.g., a drone). The XR device may include an augmented reality (AR)/virtual reality (VR)/mixed reality (MR) device, and may be implemented in the form of a head-mounted device (HMD), a head-up display (HUD) mounted in a vehicle, a television (TV), a smartphone, a computer, a wearable device, a home appliance, a digital signage, a vehicle, a robot, and so on.

The hand-held device may include a smartphone, a smartpad, a wearable device (e.g., a smartwatch or smart glasses), and a computer (e.g., a laptop). The home appliance may include a TV, a refrigerator, and a washing machine. The IoT device may include a sensor and a smart meter. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured by using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f and the BSs 200, or between the BSs 200. Herein, the wireless communication/connections may be established through various RATs (e.g., 5G NR) such as UL/DL communication 150a, sidelink communication 150b (or, D2D communication), or inter-BS communication 150c (e.g. relay, integrated access backhaul (IAB)). A wireless device and a BS/a wireless devices, and BSs may transmit/receive radio signals to/from each other through the wireless communication/connections 150a, 150b, and 150c. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 22:
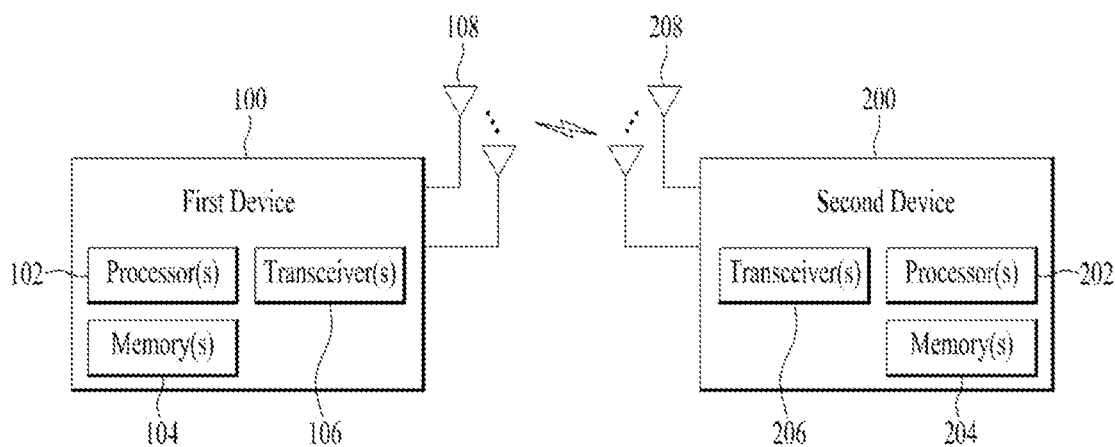
FIG. 22 is a block diagram illustrating an example of wireless devices applied to the present disclosure.

FIG. 22 illustrates wireless devices applicable to the present disclosure.

Referring to FIG. 22, a first wireless device 100 and a second wireless device 200 may transmit radio signals through a variety of RATs (e.g., LTE and NR). Herein, {the first wireless device 100 and the second wireless device 200} may correspond to {the wireless devices 100a to 100f and the BSs 200} and/or {the wireless devices 100a to 100f and the wireless devices 100a to 100f} of FIG. 21.

The first wireless device 100 may include at least one processor 102 and at least one memory 104, and may further include at least one transceiver 106 and/or at least one antenna 108. The processor 102 may control the memory 104 and/or the transceiver 106 and may be configured to implement the descriptions, functions, procedures, proposals, methods, and/or operational flowcharts disclosed in this document. For example, the processor 102 may process information within the memory 104 to generate first information/signal and then transmit a radio signal including the first information/signal through the transceiver 106. The processor 102 may receive a radio signal including second information/signal through the transceiver 106 and then store information obtained by processing the second information/signal in the memory 104. The memory 104 may be coupled to the processor 102 and store various types of information related to operations of the processor 102. For example, the memory 104 may store software code including commands for performing a part or all of processes controlled by the processor 102 or for performing the descriptions, functions, procedures, proposals, methods, and/or operational flowcharts disclosed in this document. Herein, the processor 102 and the memory 104 may be a part of a communication modem/circuit/chip designed to implement an RAT (e.g., LTE or NR). The transceiver 106 may be coupled to the processor 102 and transmit and/or receive radio signals through the at least one antenna 108. The transceiver 106 may include a transmitter and/or a receiver. The transceiver 106 may be interchangeably used with an RF unit. In the present disclosure, a wireless device may refer to a communication modem/circuit/chip.

The second wireless device 200 may include at least one processor 202 and at least one memory 204, and may further include at least one transceiver 206 and/or at least one antenna 208. The processor 202 may control the memory 204 and/or the transceiver 206 and may be configured to implement the descriptions, functions, procedures, proposals, methods, and/or operational flowcharts disclosed in this document. For example, the processor 202 may process information within the memory 204 to generate third information/signal and then transmit a radio signal including the third information/signal through the transceiver 206. The processor 202 may receive a radio signal including fourth information/signal through the transceiver 206 and then store information obtained by processing the fourth information/signal in the memory 204. The memory 204 may be coupled to the processor 202 and store various types of information related to operations of the processor 202. For example, the memory 204 may store software code including commands for performing a part or all of processes controlled by the processor 202 or for performing the descriptions, functions, procedures, proposals, methods, and/or operational flowcharts disclosed in this document. Herein, the processor 202 and the memory 204 may be a part of a communication modem/circuit/chip designed to implement an RAT (e.g., LTE or NR). The transceiver 206 may be coupled to the processor 202 and transmit and/or receive radio signals through the at least one antenna 208. The transceiver 206 may include a transmitter and/or a receiver. The transceiver 206 may be interchangeably used with an RF unit. In the present disclosure, a wireless device may refer to a communication modem/circuit/chip.

Hereinafter, hardware elements of the wireless devices 100 and 200 will be described in greater detail. One or more protocol layers may be implemented by, but not limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more protocol data units (PDUs) and/or one or more service data units (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented in hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented in firmware or software, which may be configured to include modules, procedures, or functions. Firmware or software configured to perform the descriptions, functions, procedures, proposals, methods, and/or operational flowcharts disclosed in this document may be included in the one or more processors 102 and 202, or may be stored in the one or more memories 104 and 204 and executed by the one or more processors 102 and 202. The descriptions, functions, procedures, proposals, methods, and/or operational flowcharts disclosed in this document may be implemented as code, instructions, and/or a set of instructions in firmware or software.

The one or more memories 104 and 204 may be coupled to the one or more processors 102 and 202 and store various types of data, signals, messages, information, programs, code, instructions, and/or commands. The one or more memories 104 and 204 may be configured as read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be coupled to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be coupled to the one or more processors 102 and 202 and transmit and receive radio signals. For example, the one or more processors 102 and 202 may control the one or more transceivers 106 and 206 to transmit user data, control information, or radio signals to one or more other devices. The one or more processors 102 and 202 may control the one or more transceivers 106 and 206 to receive user data, control information, or radio signals from one or more other devices. The one or more transceivers 106 and 206 may be coupled to the one or more antennas 108 and 208 and configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 23:
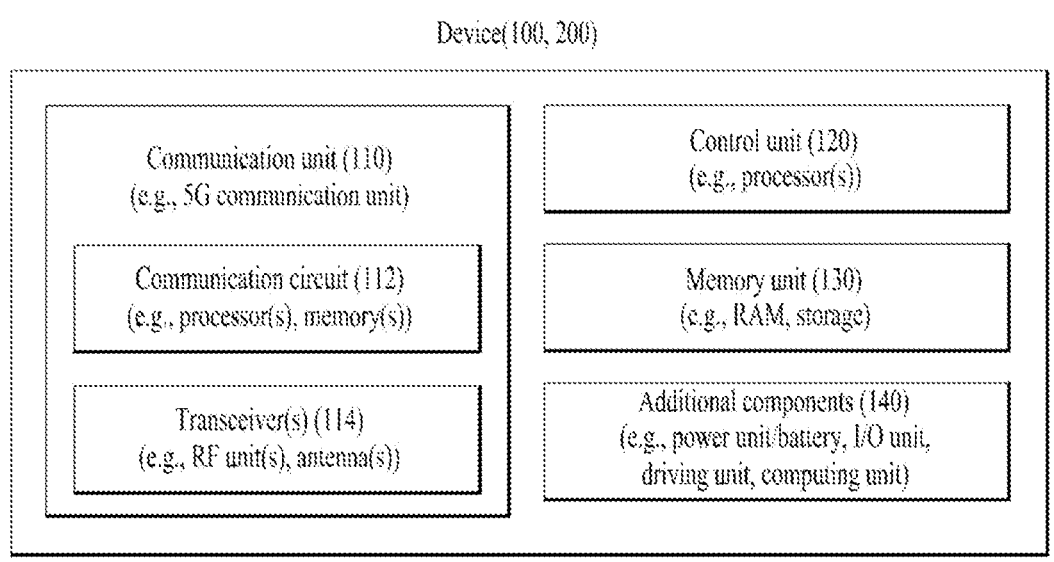
FIG. 23 is a block diagram illustrating another example of wireless devices applied to the present disclosure.

FIG. 23 illustrates another example of wireless devices applied to the present disclosure. The wireless devices may be implemented in various forms according to use-cases/services (refer to FIG. 21).

Referring to FIG. 23, wireless devices 100 and 200 may correspond to the wireless devices 100 and 200 of FIG. 22 and may be configured as various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 22. For example, the transceiver(s) 114 may include the one or more transceivers 106 and 206 and/or the one or more antennas 108 and 208 of FIG. 22. The control unit 120 is electrically coupled to the communication unit 110, the memory unit 130, and the additional components 140 and provides overall control to operations of the wireless devices. For example, the control unit 120 may control an electric/mechanical operation of the wireless device based on programs/code/commands/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to the types of wireless devices. For example, the additional components 140 may include at least one of a power unit/battery, an input/output (I/O) unit, a driver, and a computing unit. The wireless device may be configured as, but not limited to, the robot (100a of FIG. 21), the vehicles (100b-1 and 100b-2 of FIG. 21), the XR device (100c of FIG. 21), the hand-held device (100d of FIG. 21), the home appliance (100e of FIG. 21), the IoT device (100f of FIG. 21), a digital broadcasting terminal, a hologram device, a public safety device, an MTC device, a medicine device, a FinTech device (or a finance device), a security device, a climate/environment device, the AI server/device (400 of FIG. 21), the BSs (200 of FIG. 21), a network node, etc. The wireless device may be mobile or fixed according to a use-case/service.

In FIG. 23, all of the various elements, components, units/portions, and/or modules in the wireless devices 100 and 200 may be coupled to each other through a wired interface or at least a part thereof may be wirelessly coupled to each other through the communication unit 110. For example, in each of the wireless devices 100 and 200, the control unit 120 and the communication unit 110 may be coupled by wire, and the control unit 120 and first units (e.g., 130 and 140) may be wirelessly coupled through the communication unit 110. Each element, component, unit/portion, and/or module within the wireless devices 100 and 200 may further include one or more elements. For example, the control unit 120 may be configured as a set of one or more processors. For example, the control unit 120 may be configured as a set of a communication control processor, an application processor, an electronic control unit (ECU), a graphical processing unit, and a memory control processor. In another example, the memory unit 130 may be configured as a random access memory (RAM), a dynamic RAM (DRAM), a read only memory (ROM), a flash memory, a volatile memory, a non-volatile memory, and/or a combination thereof.

An implementation example of FIG. 23 will be described in detail with reference to the drawings.

Figure 24:
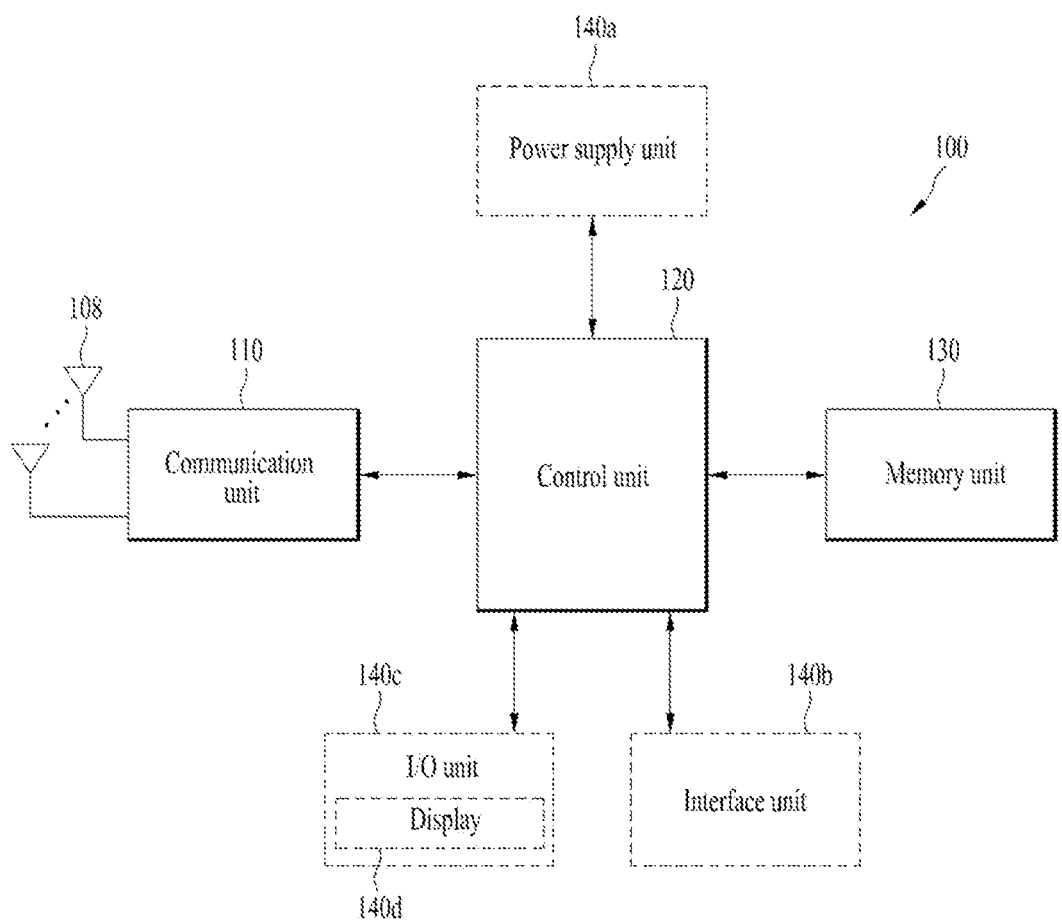
FIG. 24 is a diagram illustrating a portable device applied to the present disclosure.

FIG. 24 illustrates a portable device applied to the present disclosure. The portable device may include a smartphone, a smartpad, a wearable device (e.g., a smart watch and smart glasses), and a portable computer (e.g., a laptop). The portable device may be referred to as a mobile station (MS), a user terminal (UT), a mobile subscriber station (MSS), a subscriber station (SS), an advanced mobile station (AMS), or a wireless terminal (WT).

Referring to FIG. 24, a portable device 100 may include an antenna unit 108, a communication unit 110, a control unit 120, a power supply unit 140a, an interface unit 140b, and an I/O unit 140c. The antenna unit 108 may be configured as a part of the communication unit 110. The blocks 110 to 130/140a to 140c correspond to the blocks 110 to 130/140 of FIG. 23, respectively.

The communication unit 110 may transmit and receive signals (e.g., data and control signals) to and from another wireless device and a BS. The control unit 120 may perform various operations by controlling elements of the portable device 100. The control unit 120 may include an application processor (AP). The memory unit 130 may store data/parameters/programs/code/commands required for operation of the portable device 100. Further, the memory unit 130 may store input/output data/information. The power supply unit 140a may supply power to the portable device 100, and include a wired/wireless charging circuit and a battery. The interface unit 140b may include various ports (e.g., an audio I/O port and a video I/O port) for connectivity to external devices The I/O unit 140c may acquire information/signals (e.g., touch, text, voice, images, and video) input by a user, and store the acquired information/signals in the memory unit 130. The communication unit 110 may receive or output video information/signal, audio information/signal, data, and/or information input by the user. The I/O unit 140c may include a camera, a microphone, a user input unit, a display 140d, a speaker, and/or a haptic module.

For example, for data communication, the I/O unit 140c may acquire information/signals (e.g., touch, text, voice, images, and video) received from the user and store the acquired information/signal sin the memory unit 130. The communication unit 110 may convert the information/signals to radio signals and transmit the radio signals directly to another device or to a BS. Further, the communication unit 110 may receive a radio signal from another device or a BS and then restore the received radio signal to original information/signal. The restored information/signal may be stored in the memory unit 130 and output in various forms (e.g., text, voice, an image, video, and a haptic effect) through the I/O unit 140c.

Figure 25:
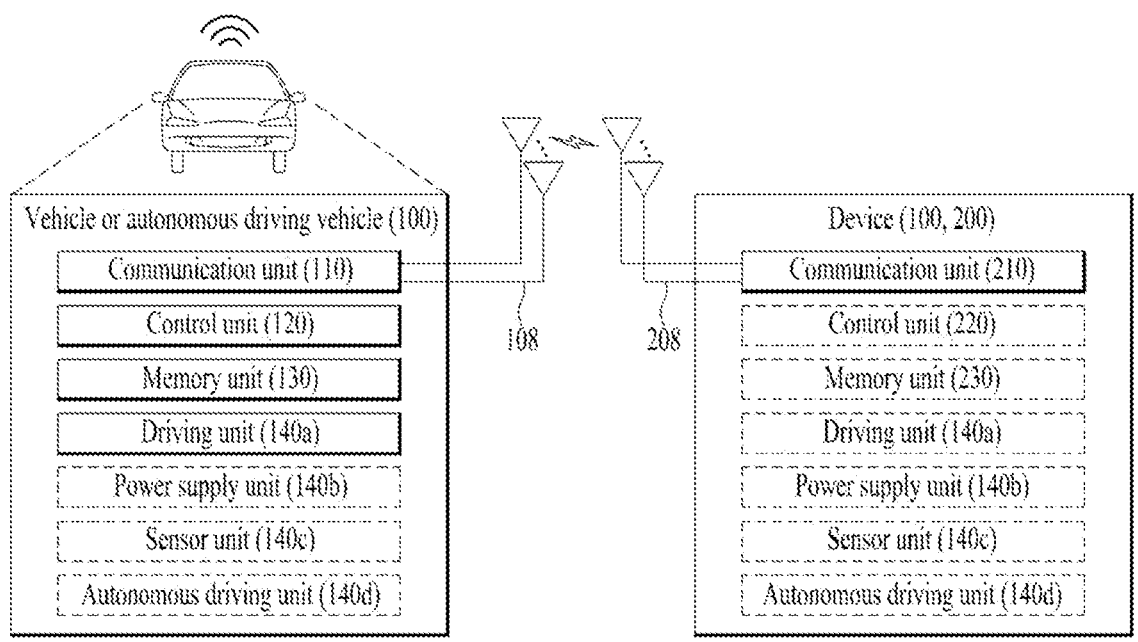
FIG. 25 is a block diagram illustrating a vehicle or autonomous driving vehicle applied to the present disclosure.

FIG. 25 illustrates a vehicle or an autonomous driving vehicle applied to the present disclosure. The vehicle or autonomous driving vehicle may be configured as a mobile robot, a car, a train, a manned/unmanned aerial vehicle (AV), a ship, or the like.

Referring to FIG. 25, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 23, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to travel on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire vehicle state information, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement a technology for maintaining a lane on which a vehicle is driving, a technology for automatically adjusting speed, such as adaptive cruise control, a technology for autonomously traveling along a determined path, a technology for traveling by automatically setting a path, when a destination is set, and the like.

For example, the communication unit 110 may receive map data, traffic information data, and so on from an external server. The autonomous driving unit 140d may generate an autonomous driving path and a driving plan from the obtained data. The control unit 120 may control the driving unit 140a such that the vehicle or autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain vehicle state information and/or ambient environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology or the like, based on the information collected from vehicles or autonomous driving vehicles and provide the predicted traffic information data to the vehicles or the autonomous driving vehicles.

The methods described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in the methods of the present disclosure may be rearranged. Some constructions of any one method may be included in another method and may be replaced with corresponding constructions of another method. It is obvious to those skilled in the art that claims that are not explicitly cited in each other in the appended claims may be presented in combination as an embodiment of the present disclosure or included as a new claim by a subsequent amendment after the application is filed.

The present disclosure is applicable to wireless communication devices such as a UE and a BS operating in various wireless communication systems including 3GPP LTE/LTE-A/5G (or New RAT (NR)).

What is claimed is:

1. A method performed by a user equipment (UE) in a wireless communication system supporting multi-transport block (multi-TB) scheduling, the method comprising:
   receiving first downlink control information (DCI);
   based on a number of TBs scheduled by the first DCI being less than a specific number, monitoring second DCI during a time period between an end of the reception of the first DCI and a start of transmission or reception of a TB scheduled by the first DCI; and
   based on the number of TBs scheduled by the first DCI being not less than the specific number, skipping the monitoring of the second DCI during the time period between the end of the reception of the first DCI and the start of the transmission or reception of the TB scheduled by the first DCI.

2. The method according to claim 1, wherein the specific number is 2 based on the wireless communication system supporting narrowband Internet of things (NB-IoT).

3. The method according to claim 1, wherein the specific number is 8 based on the wireless communication system supporting machine type communication (MTC) and the UE operating in coverage enhancement (CE) mode A.

4. The method according to claim 1, wherein the specific number is 4 based on the wireless communication system supporting MTC and the UE operating in CE mode B.

5. The method according to claim 1, wherein based on the number of TBs scheduled by the first DCI being less than the specific number, the monitoring of the second DCI is skipped during a specific time period before the transmission or reception of the TB scheduled by the first DCI.

6. The method according to claim 1, further comprising:
   receiving the TB scheduled by the first DCI; and
   receiving a TB scheduled by the second DCI based on detection of the second DCI.

7. The method according to claim 1, further comprising:
   transmitting the TB scheduled by the first DCI; and
   transmitting a TB scheduled by the second DCI based on detection of the second DCI.

8. A user equipment (UE) configured to operate in a wireless communication system supporting multi-transport block (multi-TB) scheduling, the UE comprising:
   a transceiver; and
   a processor configured to perform operations by controlling the transceiver,
   wherein the operations include:
      receiving first downlink control information (DCI);
      based on a number of TBs scheduled by the first DCI being less than a specific number, monitoring second DCI during a time period between an end of the reception of the first DCI and a start of transmission or reception of a TB scheduled by the first DCI; and
      based on the number of TBs scheduled by the first DCI being not less than the specific number, skipping the monitoring of the second DCI during the time period between the end of the reception of the first DCI and the start of the transmission or reception of the TB scheduled by the first DCI.

9. The UE according to claim 8, wherein the specific number is 2 based on the wireless communication system supporting narrowband Internet of things (NB-IoT).

10. The UE according to claim 8, wherein the specific number is 8 based on the wireless communication system supporting machine type communication (MTC) and the UE operating in coverage enhancement (CE) mode A.

11. The UE according to claim 8, wherein the specific number is 4 based on the wireless communication system supporting MTC and the UE operating in CE mode B.

12. The UE according to claim 8, wherein based on the number of TBs scheduled by the first DCI being less than the specific number, the monitoring of the second DCI is skipped during a specific time period before the transmission or reception of the TB scheduled by the first DCI.

13. The UE according to claim 8, wherein the operations further include:
   receiving the TB scheduled by the first DCI; and
   receiving a TB scheduled by the second DCI based on detection of the second DCI.

14. The UE according to claim 8, wherein the operations further include:
   transmitting the TB scheduled by the first DCI; and
   transmitting a TB scheduled by the second DCI based on detection of the second DCI.

15. A base station (BS) configured to operate in a wireless communication system supporting multi-transport block (multi-TB) scheduling, the BS comprising:
   a transceiver; and
   a processor configured to perform operations by controlling the transceiver,
   wherein the operations include:
      transmitting first downlink control information (DCI);
      based on a number of TBs scheduled by the first DCI being less than a specific number, transmitting second DCI during a time period between an end of the transmission of the first DCI and a start of transmission or reception of a TB scheduled by the first DCI; and
      based on the number of TBs scheduled by the first DCI being not less than the specific number, skipping the transmitting of the second DCI during the time period between the end of the transmission of the first DCI and the start of the transmission or reception of the TB scheduled by the first DCI.

16. The BS according to claim 15, wherein the specific number is 2 based on the wireless communication system supporting narrowband Internet of things (NB-IoT).

17. The BS according to claim 15, wherein the specific number is 8 based on the wireless communication system supporting machine type communication (MTC) and a user equipment (UE) operating in coverage enhancement (CE) mode A.

18. The BS according to claim 15, wherein the specific number is 4 based on the wireless communication system supporting MTC and a UE operating in CE mode B.

19. The BS according to claim 15, wherein based on the number of TBs scheduled by the first DCI being less than the specific number, the transmitting of the second DCI is skipped during a predetermined time period before the transmission or reception of the TB scheduled by the first DCI.

* * * * *